US011012942B2

(12) United States Patent
Freeman et al.

(10) Patent No.: US 11,012,942 B2
(45) Date of Patent: *May 18, 2021

(54) METHOD AND SYSTEM FOR OPERATING A MULTI-FUNCTION PORTABLE ELECTRONIC DEVICE USING VOICE-ACTIVATION

(71) Applicant: Apple Inc., Cupertino, CA (US)

(72) Inventors: Daniel Freeman, Santa Cruz, CA (US); Derek B. Barrentine, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,826

(22) Filed: Jan. 31, 2020

(65) Prior Publication Data

US 2020/0305084 A1 Sep. 24, 2020

Related U.S. Application Data

(63) Continuation of application No. 14/605,793, filed on Jan. 26, 2015, now Pat. No. 10,568,032, which is a
(Continued)

(51) Int. Cl.
*H04W 52/02* (2009.01)
*H04M 1/72403* (2021.01)
(Continued)

(52) U.S. Cl.
CPC ......... *H04W 52/0254* (2013.01); *G10L 15/22* (2013.01); *H04M 1/72403* (2021.01); *H04M 1/72409* (2021.01); *H04M 1/72412* (2021.01);
*H04M 1/72415* (2021.01); *H04M 1/72454* (2021.01); *G10L 2015/223* (2013.01); *H04M 1/575* (2013.01); *H04M 1/6066* (2013.01); *H04M 1/6075* (2013.01); *H04M 1/7243* (2021.01); *H04M 1/72433* (2021.01); *H04M 1/72442* (2021.01); *H04M 2250/52* (2013.01); *H04M 2250/74* (2013.01); *Y02D 30/70* (2020.08)

(58) Field of Classification Search
CPC .. G10L 15/22; G10L 2015/223; H04M 1/575; H04M 1/6066; H04M 1/6075; H04M 1/72522; H04M 1/72527; H04M 1/7253; H04M 1/72533; H04M 1/72547; H04M 1/7255; H04M 1/72558; H04M 1/72569; H04M 2250/52; H04M 2250/74; H04W 52/0254; Y02D 30/70
See application file for complete search history.

(56) References Cited

U.S. PATENT DOCUMENTS 5,878,394 A 3/1999 Muhling
6,069,648 A 5/2000 Suso et al.
(Continued)

*Primary Examiner* — Kashif Siddiqui
(74) *Attorney, Agent, or Firm* — Dentons US LLP

(57) ABSTRACT

Methods and systems in which a portable electronic device can be voice to activated are disclosed. The portable electronic device can be a multi-function electronic device. The voice activation can be robust and context sensitive. The voice activation can also be utilized without any preparatory user action with respect to the portable electronic device. The portable electronic device can also interact with a media system.

27 Claims, 15 Drawing Sheets

Related U.S. Application Data continuation of application No. 11/696,057, filed on Apr. 3, 2007, now Pat. No. 8,977,255.

(51) Int. Cl.

| | |
|---|---|
| H04M 1/72409 | (2021.01) |
| H04M 1/72412 | (2021.01) |
| H04M 1/72415 | (2021.01) |
| H04M 1/72454 | (2021.01) |
| G10L 15/22 | (2006.01) |
| H04M 1/57 | (2006.01) |
| H04M 1/60 | (2006.01) |
| H04M 1/7243 | (2021.01) |
| H04M 1/72433 | (2021.01) |
| H04M 1/72442 | (2021.01) |

(56) References Cited

U.S. PATENT DOCUMENTS

| | | |
|---|---|---|
| 6,240,303 B1 | 5/2001 | Katzur |
| 6,397,186 B1 | 5/2002 | Bush et al. |
| 6,895,257 B2 | 5/2005 | Boman et al. |
| 7,072,686 B1 | 7/2006 | Schrager |
| 7,643,990 B1 | 1/2010 | Bellegarda |
| 7,647,225 B2 | 1/2010 | Bennett et al. |
| 7,649,454 B2 | 1/2010 | Singh et al. |
| 7,649,877 B2 | 1/2010 | Vieri et al. |
| 7,653,883 B2 | 1/2010 | Hotelling et al. |
| 7,656,393 B2 | 2/2010 | King et al. |
| 7,657,424 B2 | 2/2010 | Bennett |
| 7,657,844 B2 | 2/2010 | Gibson et al. |
| 7,657,849 B2 | 2/2010 | Chaudhri et al. |
| 7,663,607 B2 | 2/2010 | Hotelling et al. |
| 7,664,558 B2 | 2/2010 | Lindahl et al. |
| 7,664,638 B2 | 2/2010 | Cooper et al. |
| 7,669,134 B1 | 2/2010 | Christie et al. |
| 7,672,841 B2 | 3/2010 | Bennett |
| 7,672,952 B2 | 3/2010 | Isaacson et al. |
| 7,673,238 B2 | 3/2010 | Girish et al. |
| 7,673,340 B1 | 3/2010 | Cohen et al. |
| 7,676,026 B1 | 3/2010 | Baxter, Jr. |
| 7,676,365 B2 | 3/2010 | Hwang et al. |
| 7,676,463 B2 | 3/2010 | Thompson et al. |
| 7,679,534 B2 | 3/2010 | Kay et al. |
| 7,680,649 B2 | 3/2010 | Park |
| 7,681,126 B2 | 3/2010 | Roose |
| 7,683,886 B2 | 3/2010 | Willey |
| 7,683,893 B2 | 3/2010 | Kim |
| 7,684,985 B2 | 3/2010 | Dominach et al. |
| 7,684,990 B2 | 3/2010 | Caskey et al. |
| 7,684,991 B2 | 3/2010 | Stohr et al. |
| 7,689,245 B2 | 3/2010 | Cox et al. |
| 7,689,408 B2 | 3/2010 | Chen et al. |
| 7,689,409 B2 | 3/2010 | Heinecke |
| 7,689,421 B2 | 3/2010 | Li et al. |
| 7,693,715 B2 | 4/2010 | Hwang et al. |
| 7,693,717 B2 | 4/2010 | Kahn et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,706,510 B2 | 4/2010 | Ng |
| 7,707,026 B2 | 4/2010 | Liu |
| 7,707,027 B2 | 4/2010 | Balchandran et al. |
| 7,707,032 B2 | 4/2010 | Wang et al. |
| 7,707,221 B1 | 4/2010 | Dunning et al. |
| 7,707,267 B2 | 4/2010 | Lisitsa et al. |
| 7,710,262 B2 | 5/2010 | Ruha |
| 7,711,129 B2 | 5/2010 | Lindahl et al. |
| 7,711,550 B1 | 5/2010 | Feinberg et al. |
| 7,711,565 B1 | 5/2010 | Gazdzinski |
| 7,711,672 B2 | 5/2010 | Au |
| 7,712,053 B2 | 5/2010 | Bradford et al. |
| 7,716,056 B2 | 5/2010 | Weng et al. |
| 7,716,216 B1 | 5/2010 | Harik et al. |
| 7,720,674 B2 | 5/2010 | Kaiser et al. |
| 7,720,683 B1 | 5/2010 | Vermeulen et al. |
| 7,721,226 B2 | 5/2010 | Barabe et al. |
| 7,721,301 B2 | 5/2010 | Wong et al. |
| 7,724,242 B2 | 5/2010 | Hillis et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,725,838 B2 | 5/2010 | Williams |
| 7,729,904 B2 | 6/2010 | Bennett |
| 7,729,916 B2 | 6/2010 | Coffman et al. |
| 7,734,461 B2 | 6/2010 | Kwak et al. |
| 7,735,012 B2 | 6/2010 | Naik |
| 7,739,588 B2 | 6/2010 | Reynar et al. |
| 7,742,953 B2 | 6/2010 | King et al. |
| 7,743,188 B2 | 6/2010 | Haitani et al. |
| 7,747,616 B2 | 6/2010 | Yamada et al. |
| 7,752,152 B2 | 7/2010 | Paek et al. |
| 7,756,868 B2 | 7/2010 | Lee |
| 7,757,173 B2 | 7/2010 | Beaman |
| 7,757,182 B2 | 7/2010 | Elliott et al. |
| 7,761,296 B1 | 7/2010 | Bakis et al. |
| 7,763,842 B2 | 7/2010 | Hsu et al. |
| 7,774,204 B2 | 8/2010 | Mozer et al. |
| 7,774,388 B1 | 8/2010 | Runchey |
| 7,778,432 B2 | 8/2010 | Larsen |
| 7,778,595 B2 | 8/2010 | White et al. |
| 7,778,632 B2 | 8/2010 | Kurlander et al. |
| 7,779,353 B2 | 8/2010 | Grigoriu et al. |
| 7,779,356 B2 | 8/2010 | Griesmer |
| 7,779,357 B2 | 8/2010 | Naik |
| 7,783,283 B2 | 8/2010 | Kuusinen et al. |
| 7,783,486 B2 | 8/2010 | Rosser et al. |
| 7,788,590 B2 | 8/2010 | Taboada et al. |
| 7,797,265 B2 | 9/2010 | Brinker et al. |
| 7,797,269 B2 | 9/2010 | Rieman et al. |
| 7,797,331 B2 | 9/2010 | Theimer et al. |
| 7,801,721 B2 | 9/2010 | Rosart et al. |
| 7,801,728 B2 | 9/2010 | Ben-david et al. |
| 7,801,729 B2 | 9/2010 | Mozer |
| 7,805,299 B2 | 9/2010 | Coifman |
| 7,809,565 B2 | 10/2010 | Coifman |
| 7,809,569 B2 | 10/2010 | Attwater et al. |
| 7,809,570 B2 | 10/2010 | Kennewick et al. |
| 7,809,610 B2 | 10/2010 | Cao |
| 7,809,744 B2 | 10/2010 | Nevidomski et al. |
| 7,818,165 B2 | 10/2010 | Carlgren et al. |
| 7,818,176 B2 | 10/2010 | Freeman et al. |
| 7,818,215 B2 | 10/2010 | King et al. |
| 7,818,291 B2 | 10/2010 | Ferguson et al. |
| 7,818,672 B2 | 10/2010 | McCormack et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,423 B2 | 11/2010 | Schubert |
| 7,831,426 B2 | 11/2010 | Bennett |
| 7,831,432 B2 | 11/2010 | Bodin et al. |
| 7,836,437 B2 | 11/2010 | Kacmarcik |
| 7,840,400 B2 | 11/2010 | Lavi et al. |
| 7,840,447 B2 | 11/2010 | Kleinrock et al. |
| 7,840,581 B2 | 11/2010 | Ross et al. |
| 7,840,912 B2 | 11/2010 | Elias et al. |
| 7,848,924 B2 | 12/2010 | Nurminen et al. |
| 7,848,926 B2 | 12/2010 | Goto et al. |
| 7,853,444 B2 | 12/2010 | Wang et al. |
| 7,853,445 B2 | 12/2010 | Bachenko et al. |
| 7,853,574 B2 | 12/2010 | Kraenzel et al. |
| 7,853,577 B2 | 12/2010 | Sundaresan et al. |
| 7,853,664 B1 | 12/2010 | Wang et al. |
| 7,853,900 B2 | 12/2010 | Nguyen et al. |
| 7,865,817 B2 | 1/2011 | Ryan et al. |
| 7,869,999 B2 | 1/2011 | Amato et al. |
| 7,870,118 B2 | 1/2011 | Jiang et al. |
| 7,873,519 B2 | 1/2011 | Bennett |
| 7,873,654 B2 | 1/2011 | Bernard |

(56) References Cited

U.S. PATENT DOCUMENTS

| | | |
|---|---|---|
| 7,877,705 B2 | 1/2011 | Chambers et al. |
| 7,880,730 B2 | 2/2011 | Robinson et al. |
| 7,881,936 B2 | 2/2011 | Longe et al. |
| 7,885,844 B1 | 2/2011 | Cohen et al. |
| 7,886,233 B2 | 2/2011 | Rainisto et al. |
| 7,889,184 B2 | 2/2011 | Blumenberg et al. |
| 7,889,185 B2 | 2/2011 | Blumenberg et al. |
| 7,890,330 B2 | 2/2011 | Ozkaragoz et al. |
| 7,890,652 B2 | 2/2011 | Bull et al. |
| 7,895,531 B2 | 2/2011 | Radtke et al. |
| 7,899,666 B2 | 3/2011 | Varone |
| 7,908,287 B1 | 3/2011 | Katragadda |
| 7,912,289 B2 | 3/2011 | Kansai et al. |
| 7,912,699 B1 | 3/2011 | Saraclar et al. |
| 7,912,702 B2 | 3/2011 | Bennett |
| 7,912,720 B1 | 3/2011 | Hakkani-tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,936,339 B2 | 5/2011 | Marggraff et al. |
| 7,941,009 B2 | 5/2011 | Li et al. |
| 7,945,470 B1 | 5/2011 | Cohen et al. |
| 7,949,529 B2 | 5/2011 | Weider et al. |
| 7,949,534 B2 | 5/2011 | Davis et al. |
| 7,953,679 B2 | 5/2011 | Chidlovskii et al. |
| 7,957,975 B2 | 6/2011 | Burns et al. |
| 7,962,179 B2 | 6/2011 | Huang |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,244 B1 | 7/2011 | Lewis et al. |
| 7,991,614 B2 | 8/2011 | Washio et al. |
| 7,992,085 B2 | 8/2011 | Wang-aryattanwanich et al. |
| 7,996,228 B2 | 8/2011 | Miller et al. |
| 7,996,589 B2 | 8/2011 | Schultz et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,019,271 B1 | 9/2011 | Izdepski |
| 8,024,195 B2 | 9/2011 | Mozer et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,042,053 B2 | 10/2011 | Darwish et al. |
| 8,046,363 B2 | 10/2011 | Cha et al. |
| 8,050,500 B1 | 11/2011 | Batty et al. |
| 8,055,502 B2 | 11/2011 | Clark et al. |
| 8,055,708 B2 | 11/2011 | Chitsaz et al. |
| 8,060,824 B2 | 11/2011 | Brownrigg, Jr. et al. |
| 8,064,753 B2 | 11/2011 | Freeman |
| 8,065,143 B2 | 11/2011 | Yanagihara |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,077,153 B2 | 12/2011 | Benko et al. |
| 8,078,473 B1 | 12/2011 | Gazdzinski |
| 8,082,153 B2 | 12/2011 | Coffman et al. |
| 8,082,498 B2 | 12/2011 | Salamon et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,335 B2 | 3/2012 | Kennewick et al. |
| 8,140,567 B2 | 3/2012 | Padovitz et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,170,790 B2 | 5/2012 | Lee et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,195,467 B2 | 6/2012 | Mozer et al. |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,183 B1 | 6/2012 | Patel et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,608 B2 | 7/2012 | Alsafadi et al. |
| 8,224,649 B2 | 7/2012 | Chaudhari et al. |
| 8,239,207 B2 | 8/2012 | Seligman et al. |
| 8,255,217 B2 | 8/2012 | Stent et al. |
| 8,275,621 B2 | 9/2012 | Alewine et al. |
| 8,285,546 B2 | 10/2012 | Reich |
| 8,285,551 B2 | 10/2012 | Gazdzinski |
| 8,285,553 B2 | 10/2012 | Gazdzinski |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,801 B2 | 10/2012 | Sweeney et al. |
| 8,301,456 B2 | 10/2012 | Gazdzinski |
| 8,311,834 B1 | 11/2012 | Gazdzinski |
| 8,332,224 B2 | 12/2012 | Di Cristo et al. |
| 8,332,748 B1 | 12/2012 | Karam |
| 8,345,665 B2 | 1/2013 | Vieri et al. |
| 8,352,183 B2 | 1/2013 | Thota et al. |

(56) References Cited

U.S. PATENT DOCUMENTS

| | | |
|---|---|---|
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,381,107 B2 | 2/2013 | Rottler et al. |
| 8,381,135 B2 | 2/2013 | Hotelling et al. |
| 8,396,714 B2 | 3/2013 | Rogers et al. |
| 8,423,288 B2 | 4/2013 | Stahl et al. |
| 8,428,758 B2 | 4/2013 | Naik et al. |
| 8,447,612 B2 | 5/2013 | Gazdzinski |
| 8,479,122 B2 | 7/2013 | Hotelling et al. |
| 8,489,599 B2 | 7/2013 | Bellotti |
| 8,498,857 B2 | 7/2013 | Kopparapu et al. |
| 8,521,513 B2 | 8/2013 | Millett et al. |
| 8,583,416 B2 | 11/2013 | Huang et al. |
| 8,589,869 B2 | 11/2013 | Wolfram |
| 8,595,004 B2 | 11/2013 | Koshinaka |
| 8,620,659 B2 | 12/2013 | Di Cristo et al. |
| 8,645,137 B2 | 2/2014 | Bellegarda et al. |
| 8,655,901 B1 | 2/2014 | Li et al. |
| 8,660,849 B2 | 2/2014 | Gruber et al. |
| 8,660,970 B1 | 2/2014 | Fiedorowicz |
| 8,706,472 B2 | 4/2014 | Ramerth et al. |
| 8,731,610 B2 | 5/2014 | Appaji |
| 8,760,537 B2 | 6/2014 | Johnson et al. |
| 8,768,693 B2 | 7/2014 | Somekh et al. |
| 8,838,457 B2 | 9/2014 | Cerra et al. |
| 8,880,405 B2 | 11/2014 | Cerra et al. |
| 8,886,540 B2 | 11/2014 | Cerra et al. |
| 8,943,423 B2 | 1/2015 | Merrill et al. |
| 8,972,878 B2 | 3/2015 | Mohler et al. |
| 8,977,255 B2 * | 3/2015 | Freeman ............ H04M 1/72522 455/425 |
| 10,568,032 B2 * | 2/2020 | Freeman ............ H04W 52/0254 |
| 2002/0059066 A1 | 5/2002 | O'hagan |
| 2002/0091511 A1 | 7/2002 | Hellwig et al. |
| 2004/0106432 A1 | 6/2004 | Kanamori et al. |
| 2005/0027385 A1 | 2/2005 | Yueh |
| 2006/0252457 A1 * | 11/2006 | Schrager ............. H04M 1/6066 455/556.1 |
| 2008/0114604 A1 | 5/2008 | Wei et al. |
| 2009/0300391 A1 | 12/2009 | Jessup et al. |
| 2010/0004931 A1 | 1/2010 | Ma et al. |
| 2010/0005081 A1 | 1/2010 | Bennett |
| 2010/0013796 A1 | 1/2010 | Abileah et al. |
| 2010/0019834 A1 | 1/2010 | Zerbe et al. |
| 2010/0023318 A1 | 1/2010 | Lemoine |
| 2010/0023320 A1 | 1/2010 | Di Cristo et al. |
| 2010/0030928 A1 | 2/2010 | Conroy et al. |
| 2010/0031143 A1 | 2/2010 | Rao et al. |
| 2010/0036655 A1 | 2/2010 | Cecil et al. |
| 2010/0036660 A1 | 2/2010 | Bennett |
| 2010/0037183 A1 | 2/2010 | Miyashita et al. |
| 2010/0042400 A1 | 2/2010 | Block et al. |
| 2010/0049514 A1 | 2/2010 | Kennewick et al. |
| 2010/0050064 A1 | 2/2010 | Liu et al. |
| 2010/0054512 A1 | 3/2010 | Solum |
| 2010/0057457 A1 | 3/2010 | Ogata et al. |
| 2010/0057643 A1 | 3/2010 | Yang |
| 2010/0060646 A1 | 3/2010 | Unsal et al. |
| 2010/0063804 A1 | 3/2010 | Sato et al. |
| 2010/0063825 A1 | 3/2010 | Williams et al. |
| 2010/0063961 A1 | 3/2010 | Guiheneuf et al. |
| 2010/0064113 A1 | 3/2010 | Lindahl et al. |
| 2010/0067723 A1 | 3/2010 | Bergmann et al. |
| 2010/0067867 A1 | 3/2010 | Lin |
| 2010/0070281 A1 | 3/2010 | Conkie et al. |
| 2010/0070899 A1 | 3/2010 | Hunt et al. |
| 2010/0076760 A1 | 3/2010 | Kraenzel et al. |
| 2010/0079501 A1 | 4/2010 | Ikeda et al. |
| 2010/0080398 A1 | 4/2010 | Waldmann |
| 2010/0080470 A1 | 4/2010 | Deluca et al. |
| 2010/0081456 A1 | 4/2010 | Singh et al. |
| 2010/0081487 A1 | 4/2010 | Chen et al. |
| 2010/0082327 A1 | 4/2010 | Rogers et al. |
| 2010/0082328 A1 | 4/2010 | Rogers et al. |
| 2010/0082329 A1 | 4/2010 | Silverman et al. |
| 2010/0082346 A1 | 4/2010 | Rogers et al. |
| 2010/0082347 A1 | 4/2010 | Rogers et al. |
| 2010/0082348 A1 | 4/2010 | Silverman et al. |
| 2010/0082349 A1 | 4/2010 | Bellegarda et al. |
| 2010/0082970 A1 | 4/2010 | Lindahl et al. |
| 2010/0086152 A1 | 4/2010 | Rank et al. |
| 2010/0086153 A1 | 4/2010 | Hagen et al. |
| 2010/0086156 A1 | 4/2010 | Rank et al. |
| 2010/0088020 A1 | 4/2010 | Sano et al. |
| 2010/0088093 A1 | 4/2010 | Lee et al. |
| 2010/0088100 A1 | 4/2010 | Lindahl |
| 2010/0100212 A1 | 4/2010 | Lindahl et al. |
| 2010/0100384 A1 | 4/2010 | Ju et al. |
| 2010/0103776 A1 | 4/2010 | Chan |
| 2010/0106500 A1 | 4/2010 | Mckee et al. |
| 2010/0114856 A1 | 5/2010 | Kuboyama |
| 2010/0125460 A1 | 5/2010 | Mellott et al. |
| 2010/0125811 A1 | 5/2010 | Moore et al. |
| 2010/0131273 A1 | 5/2010 | Aley-raz et al. |
| 2010/0131498 A1 | 5/2010 | Linthicum et al. |
| 2010/0131899 A1 | 5/2010 | Hubert |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0142740 A1 | 6/2010 | Roerup |
| 2010/0145694 A1 | 6/2010 | Ju et al. |
| 2010/0145700 A1 | 6/2010 | Kennewick et al. |
| 2010/0146442 A1 | 6/2010 | Nagasaka et al. |
| 2010/0153115 A1 | 6/2010 | Klee et al. |
| 2010/0161313 A1 | 6/2010 | Karttunen |
| 2010/0161554 A1 | 6/2010 | Datuashvili et al. |
| 2010/0164897 A1 | 7/2010 | Morin et al. |
| 2010/0169075 A1 | 7/2010 | Raffa et al. |
| 2010/0169097 A1 | 7/2010 | Nachman et al. |
| 2010/0171713 A1 | 7/2010 | Kwok et al. |
| 2010/0174544 A1 | 7/2010 | Heifets |
| 2010/0179932 A1 | 7/2010 | Yoon et al. |
| 2010/0179991 A1 | 7/2010 | Lorch et al. |
| 2010/0185448 A1 | 7/2010 | Meisel |
| 2010/0185949 A1 | 7/2010 | Jaeger |
| 2010/0197359 A1 | 8/2010 | Harris |
| 2010/0204986 A1 | 8/2010 | Kennewick et al. |
| 2010/0211199 A1 | 8/2010 | Naik et al. |
| 2010/0217604 A1 | 8/2010 | Baldwin et al. |
| 2010/0222098 A1 | 9/2010 | Garg |
| 2010/0223055 A1 | 9/2010 | Mclean |
| 2010/0228540 A1 | 9/2010 | Bennett |
| 2010/0228691 A1 | 9/2010 | Yang et al. |
| 2010/0231474 A1 | 9/2010 | Yamagajo et al. |
| 2010/0235167 A1 | 9/2010 | Bourdon |
| 2010/0235341 A1 | 9/2010 | Bennett |
| 2010/0235729 A1 | 9/2010 | Kocienda et al. |
| 2010/0235770 A1 | 9/2010 | Ording et al. |
| 2010/0250542 A1 | 9/2010 | Fujimaki |
| 2010/0250599 A1 | 9/2010 | Schmidt et al. |
| 2010/0257160 A1 | 10/2010 | Cao |
| 2010/0257478 A1 | 10/2010 | Longe et al. |
| 2010/0262599 A1 | 10/2010 | Nitz |
| 2010/0268539 A1 | 10/2010 | Xu et al. |
| 2010/0274753 A1 | 10/2010 | Liberty et al. |
| 2010/0277579 A1 | 11/2010 | Cho et al. |
| 2010/0278320 A1 | 11/2010 | Arsenault et al. |
| 2010/0278453 A1 | 11/2010 | King |
| 2010/0280983 A1 | 11/2010 | Cho et al. |
| 2010/0281034 A1 | 11/2010 | Petrou et al. |
| 2010/0286985 A1 | 11/2010 | Kennewick et al. |
| 2010/0287514 A1 | 11/2010 | Cragun et al. |
| 2010/0293460 A1 | 11/2010 | Budelli |
| 2010/0299133 A1 | 11/2010 | Kopparapu et al. |
| 2010/0299138 A1 | 11/2010 | Kim |
| 2010/0299142 A1 | 11/2010 | Freeman et al. |
| 2010/0302056 A1 | 12/2010 | Dutton et al. |

(56) References Cited

U.S. PATENT DOCUMENTS

| | | |
|---|---|---|
| 2010/0305807 A1 | 12/2010 | Basir et al. |
| 2010/0305947 A1 | 12/2010 | Schwarz et al. |
| 2010/0312547 A1 | 12/2010 | Van Os et al. |
| 2010/0312566 A1 | 12/2010 | Odinak et al. |
| 2010/0318576 A1 | 12/2010 | Kim |
| 2010/0322438 A1 | 12/2010 | Siotis |
| 2010/0324895 A1 | 12/2010 | Kurzweil et al. |
| 2010/0324905 A1 | 12/2010 | Kurzweil et al. |
| 2010/0325573 A1 | 12/2010 | Estrada et al. |
| 2010/0325588 A1 | 12/2010 | Reddy et al. |
| 2010/0332224 A1 | 12/2010 | Makela et al. |
| 2010/0332235 A1 | 12/2010 | David |
| 2010/0332280 A1 | 12/2010 | Bradley et al. |
| 2010/0332348 A1 | 12/2010 | Cao |
| 2010/0332428 A1 | 12/2010 | Mchenry et al. |
| 2010/0332976 A1 | 12/2010 | Fux et al. |
| 2010/0333030 A1 | 12/2010 | Johns |
| 2011/0002487 A1 | 1/2011 | Panther et al. |
| 2011/0010178 A1 | 1/2011 | Lee et al. |
| 2011/0010644 A1 | 1/2011 | Merrill et al. |
| 2011/0016150 A1 | 1/2011 | Engstrom et al. |
| 2011/0018695 A1 | 1/2011 | Bells et al. |
| 2011/0021213 A1 | 1/2011 | Carr |
| 2011/0022292 A1 | 1/2011 | Shen et al. |
| 2011/0022394 A1 | 1/2011 | Wide |
| 2011/0022952 A1 | 1/2011 | Wu et al. |
| 2011/0029616 A1 | 2/2011 | Wang et al. |
| 2011/0033064 A1 | 2/2011 | Johnson et al. |
| 2011/0038489 A1 | 2/2011 | Visser et al. |
| 2011/0047072 A1 | 2/2011 | Ciurea |
| 2011/0047161 A1 | 2/2011 | Myaeng et al. |
| 2011/0050591 A1 | 3/2011 | Kim et al. |
| 2011/0054901 A1 | 3/2011 | Qin et al. |
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060807 A1 | 3/2011 | Martin et al. |
| 2011/0066468 A1 | 3/2011 | Huang et al. |
| 2011/0072492 A1 | 3/2011 | Mohler et al. |
| 2011/0076994 A1 | 3/2011 | Kim et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0090078 A1 | 4/2011 | Kim et al. |
| 2011/0093261 A1 | 4/2011 | Angott |
| 2011/0093265 A1 | 4/2011 | Stent et al. |
| 2011/0093271 A1 | 4/2011 | Bernard |
| 2011/0099000 A1 | 4/2011 | Rai et al. |
| 2011/0103682 A1 | 5/2011 | Chidlovskii et al. |
| 2011/0106736 A1 | 5/2011 | Aharonson et al. |
| 2011/0110502 A1 | 5/2011 | Daye et al. |
| 2011/0112827 A1 | 5/2011 | Kennewick et al. |
| 2011/0112837 A1 | 5/2011 | Kurki-suonio et al. |
| 2011/0112921 A1 | 5/2011 | Kennewick et al. |
| 2011/0116480 A1* | 5/2011 | Li ................... H04W 28/04 370/332 |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0125540 A1 | 5/2011 | Jang et al. |
| 2011/0130958 A1 | 6/2011 | Stahl et al. |
| 2011/0131036 A1 | 6/2011 | Dicristo et al. |
| 2011/0131038 A1 | 6/2011 | Oyaizu et al. |
| 2011/0131045 A1 | 6/2011 | Cristo et al. |
| 2011/0143811 A1 | 6/2011 | Rodriguez |
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151830 A1 | 6/2011 | Blanda, Jr. et al. |
| 2011/0153209 A1 | 6/2011 | Geelen |
| 2011/0153330 A1 | 6/2011 | Yazdani et al. |
| 2011/0157029 A1 | 6/2011 | Tseng |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0167350 A1 | 7/2011 | Hoellwarth |
| 2011/0175810 A1 | 7/2011 | Markovic et al. |
| 2011/0179002 A1 | 7/2011 | Dumitru et al. |
| 2011/0179372 A1 | 7/2011 | Moore et al. |
| 2011/0184721 A1 | 7/2011 | Subramanian et al. |
| 2011/0184730 A1 | 7/2011 | Lebeau et al. |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0201387 A1 | 8/2011 | Paek et al. |
| 2011/0209088 A1 | 8/2011 | Hinckley et al. |
| 2011/0212717 A1 | 9/2011 | Rhoads et al. |
| 2011/0218855 A1 | 9/2011 | Cao et al. |
| 2011/0219018 A1 | 9/2011 | Bailey et al. |
| 2011/0224972 A1 | 9/2011 | Millett et al. |
| 2011/0231182 A1 | 9/2011 | Weider et al. |
| 2011/0231188 A1 | 9/2011 | Kennewick et al. |
| 2011/0231474 A1 | 9/2011 | Locker et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0242007 A1 | 10/2011 | Gray et al. |
| 2011/0249144 A1 | 10/2011 | Chang |
| 2011/0260861 A1 | 10/2011 | Singh et al. |
| 2011/0264643 A1 | 10/2011 | Cao |
| 2011/0274303 A1 | 11/2011 | Filson et al. |
| 2011/0276598 A1 | 11/2011 | Kozempel |
| 2011/0279368 A1 | 11/2011 | Klein et al. |
| 2011/0282888 A1 | 11/2011 | Koperski et al. |
| 2011/0288861 A1 | 11/2011 | Kurzwei et al. |
| 2011/0298585 A1 | 12/2011 | Barry |
| 2011/0306426 A1 | 12/2011 | Novak et al. |
| 2011/0307491 A1 | 12/2011 | Fisk et al. |
| 2011/0307810 A1 | 12/2011 | Hilerio et al. |
| 2011/0314032 A1 | 12/2011 | Bennett et al. |
| 2011/0314404 A1 | 12/2011 | Kotler et al. |
| 2012/0002820 A1 | 1/2012 | Leichter |
| 2012/0011138 A1 | 1/2012 | Dunning et al. |
| 2012/0013609 A1 | 1/2012 | Reponen et al. |
| 2012/0016678 A1 | 1/2012 | Gruber et al. |
| 2012/0020490 A1 | 1/2012 | Leichter |
| 2012/0022787 A1 | 1/2012 | Lebeau et al. |
| 2012/0022857 A1 | 1/2012 | Baldwin et al. |
| 2012/0022860 A1 | 1/2012 | Lloyd et al. |
| 2012/0022868 A1 | 1/2012 | Lebeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | Lebeau et al. |
| 2012/0023088 A1 | 1/2012 | Cheng et al. |
| 2012/0034904 A1 | 2/2012 | Lebeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035931 A1 | 2/2012 | Lebeau et al. |
| 2012/0035932 A1 | 2/2012 | Jitkoff et al. |
| 2012/0036556 A1 | 2/2012 | Lebeau et al. |
| 2012/0042343 A1 | 2/2012 | Laligand et al. |
| 2012/0053815 A1 | 3/2012 | Montanari et al. |
| 2012/0053945 A1 | 3/2012 | Gupta et al. |
| 2012/0056815 A1 | 3/2012 | Mehra |
| 2012/0078627 A1 | 3/2012 | Wagner |
| 2012/0082317 A1 | 4/2012 | Pance et al. |
| 2012/0084086 A1 | 4/2012 | Gilbert et al. |
| 2012/0108221 A1 | 5/2012 | Thomas et al. |
| 2012/0116770 A1 | 5/2012 | Chen et al. |
| 2012/0124126 A1 | 5/2012 | Alcazar et al. |
| 2012/0136572 A1 | 5/2012 | Norton |
| 2012/0137367 A1 | 5/2012 | Dupont et al. |
| 2012/0149394 A1 | 6/2012 | Singh et al. |
| 2012/0150580 A1 | 6/2012 | Norton |
| 2012/0158293 A1 | 6/2012 | Burnham |
| 2012/0158422 A1 | 6/2012 | Burnham et al. |
| 2012/0163710 A1 | 6/2012 | Skaff et al. |
| 2012/0173464 A1 | 7/2012 | Tur et al. |
| 2012/0174121 A1 | 7/2012 | Treat et al. |

(56) References Cited

U.S. PATENT DOCUMENTS

| | | |
|---|---|---|
| 2012/0185237 A1 | 7/2012 | Gajic et al. |
| 2012/0197995 A1 | 8/2012 | Caruso |
| 2012/0197998 A1 | 8/2012 | Kessel et al. |
| 2012/0201362 A1 | 8/2012 | Crossan et al. |
| 2012/0214141 A1 | 8/2012 | Raya et al. |
| 2012/0214517 A1 | 8/2012 | Singh et al. |
| 2012/0221339 A1 | 8/2012 | Wang et al. |
| 2012/0221552 A1 | 8/2012 | Reponen et al. |
| 2012/0245719 A1 | 9/2012 | Story, Jr. et al. |
| 2012/0245941 A1 | 9/2012 | Cheyer |
| 2012/0245944 A1 | 9/2012 | Gruber et al. |
| 2012/0252367 A1 | 10/2012 | Gaglio et al. |
| 2012/0254152 A1 | 10/2012 | Park et al. |
| 2012/0265528 A1 | 10/2012 | Gruber et al. |
| 2012/0265535 A1 | 10/2012 | Bryant-rich et al. |
| 2012/0271625 A1 | 10/2012 | Bernard |
| 2012/0271635 A1 | 10/2012 | Ljolje |
| 2012/0271676 A1 | 10/2012 | Aravamudan et al. |
| 2012/0284027 A1 | 11/2012 | Mallett et al. |
| 2012/0290300 A1 | 11/2012 | Lee et al. |
| 2012/0296649 A1 | 11/2012 | Bansal et al. |
| 2012/0304124 A1 | 11/2012 | Chen et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O"sullivan |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0317498 A1 | 12/2012 | Logan et al. |
| 2012/0330660 A1 | 12/2012 | Jaiswal |
| 2012/0330661 A1 | 12/2012 | Lindahl |
| 2013/0006633 A1 | 1/2013 | Grokop et al. |
| 2013/0006638 A1 | 1/2013 | Lindahl |
| 2013/0055099 A1 | 2/2013 | Yao et al. |
| 2013/0073286 A1 | 3/2013 | Bastea-forte et al. |
| 2013/0080167 A1 | 3/2013 | Mozer |
| 2013/0080177 A1 | 3/2013 | Chen |
| 2013/0085761 A1 | 4/2013 | Bringert et al. |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0111348 A1 | 5/2013 | Gruber et al. |
| 2013/0111487 A1 | 5/2013 | Cheyer et al. |
| 2013/0115927 A1 | 5/2013 | Gruber et al. |
| 2013/0117022 A1 | 5/2013 | Chen et al. |
| 2013/0170738 A1 | 7/2013 | Capuozzo et al. |
| 2013/0185074 A1 | 7/2013 | Gruber et al. |
| 2013/0185081 A1 | 7/2013 | Cheyer et al. |
| 2013/0225128 A1 | 8/2013 | Gomar |
| 2013/0238647 A1 | 9/2013 | Thompson |
| 2013/0275117 A1 | 10/2013 | Winer |
| 2013/0289991 A1 | 10/2013 | Eshwar et al. |
| 2013/0304758 A1 | 11/2013 | Gruber et al. |
| 2013/0325443 A1 | 12/2013 | Begeja et al. |
| 2013/0346068 A1 | 12/2013 | Solem et al. |
| 2014/0080428 A1 | 3/2014 | Rhoads et al. |
| 2014/0086458 A1 | 3/2014 | Rogers |
| 2014/0152577 A1 | 6/2014 | Yuen et al. |
| 2015/0133109 A1 | 5/2015 | Freeman et al. |

\* cited by examiner

METHOD AND SYSTEM FOR OPERATING A MULTI-FUNCTION PORTABLE ELECTRONIC DEVICE USING VOICE-ACTIVATION

CROSS-REFERENCE TO RELATED APPLICATIONS

This application is a continuation of U.S. patent application Ser. No. 14/605,793, entitled "METHOD AND SYSTEM FOR OPERATING A MULTI-FUNCTION PORTABLE ELECTRONIC DEVICE USING VOICE-ACTIVATION," filed Jan. 26, 2015, which claims priority to U.S. Provisional application Ser. No. 11/696,057, entitled "METHOD AND SYSTEM FOR OPERATING A MULTI-FUNCTION PORTABLE ELECTRONIC DEVICE USING VOICE-ACTIVATION," filed Apr. 3, 2007, the content of which are hereby incorporated by reference in their entireties.

BACKGROUND OF THE INVENTION

Field of the Invention

The present invention relates to a portable electronic device and, more particularly, to a multi-function portable electronic device.

Description of the Related Art

Today, cellular phones primarily require manual interaction by a user to invoke functions or to enter data, etc. However, cellular phones can also support limited voice activation. For example, a user can press a predetermined button, then speak a name of a person in the address book of the cellular phone. If the cellular phone recognizes the spoken name, then the person can be automatically called using the phone number provided in the address book. Cellular phones can also be use inside automobiles in a similar fashion. Some automobiles also support hands-free cellular operation by providing an embedded speaker and microphone internal to the vehicle. Bluetooth car kits are also available to add-on a speaker and microphone for hands-free operation. In any case, with cellular phones, voice commands are also conventionally limited to recognizing names of contacts within an address book and require manual user interaction with the cellular phone or automobile (e.g., button press) prior to any voice command.

Specialized computer programs also exist which can execute on a personal computer and wirelessly interact with a Bluetooth-enabled cellular phone. For example, a user interface displayed on a personal computer can allow a user to dial, answer, hang up and hold calls with respect to a cellular phone. Users can also be alerted at the personal computer of incoming calls or SMS messages. When a call is received at the cellular phone, media playback in progress at the personal computer can be paused.

SUMMARY OF THE INVENTION

The invention pertains to voice activation for a portable electronic device. The portable electronic device can be a multi-function electronic device. The voice activation can be robust and context sensitive. The voice activation can also be utilized without any preparatory user action with respect to the portable electronic device. The portable electronic device can also interact with a media system.

According to one embodiment, one function that can be supported by the portable electronic device is voice communications. When a voice call is incoming to the portable electronic device, the portable electronic device can automatically control itself or the media system to pause, stop and/or lower its volume so that media playback need not disturb a user while participating in the voice call. After the voice call ends, the portable electronic device can automatically control itself or the media system to resume, start and/or raise its volume so that the user can again participate in media playback.

The invention can be implemented in numerous ways, including as a method, system, device, apparatus (including graphical user interface), or computer readable medium. Several embodiments of the invention are discussed below.

As a method for operating a portable electronic device using voice-activated input, one embodiment of the invention can, for example, include at least: operating the portable electric device to listen for a user voice command; monitoring an operational state of the portable electronic device; receiving an audio input; determining a set of commands that are authorized for usage with the portable electronic while in the operational state; determining whether the audio input pertains to at least one of the commands within the set of commands; and executing the at least one of the commands within the set of commands that is determined to pertain to the audio input.

As a portable electronic device, one embodiment of the invention can, for example, include at least: a microphone capable of picking up a voice input from a user; a voice analyzer operatively connected to the microphone; and a processor for controlling operation of the portable electronic device. The voice analyzer can be configured to analyze the voice input to determine if one or more predetermined commands are to be performed. The processor can operate to perform the one or more predetermined commands when the voice analyzer determines that the voice input substantially matches characteristics of the one or more predetermined commands.

As a method for operating an electronic device supporting or coupling to a plurality of functions, where one of the functions can be wireless voice communications and another of the functions can be media playback, one embodiment of the invention can, for example, include at least: determining whether a voice call is incoming; determining when media playback is active; outputting a ringtone if a voice call is incoming and media playback is not active; outputting the ringtone mixed with media output if a voice call is incoming and media playback is active; activating a microphone if the microphone is not already active; determining whether a voice command is received while the call is incoming; answering the call when the voice command received requests that the call be answered; pausing or stopping the media playback if media playback is still active when the call is answered; determining whether the call has ended; and resuming or restarting the media playback after the call has ended.

As a computer readable medium including at least computer program code stored thereon for operating a portable electronic device using voice-activated input, one embodiment of the invention can, for example, include at least: computer program code for operating the portable electric device to listen for a user voice command; computer program code for monitoring an operational state of the portable electronic device; computer program code for determining a set of commands that are authorized for usage with the portable electronic while in the operational state; computer program code for determining whether an audio input pertains to at least one of the commands within the set of commands; and computer program code for executing the at least one of the commands within the set of commands that is determined to pertain to the audio input.

As a computer readable medium including at least computer program code stored thereon for operating an electronic device supporting or coupling to a plurality of functions, where one of the functions is wireless voice communications and another of the functions is media playback, another embodiment of the invention can, for example, include at least: computer program code for determining whether a voice call is incoming; computer program code for determining when media playback is active; computer program code for outputting a ringtone if a voice call is incoming and media playback is not active; computer program code for outputting the ringtone mixed with media output if a voice call is incoming and media playback is active; computer program code for determining whether a voice command is received while the call is incoming; computer program code for answering the call when the voice command received requests that the call be answered; computer program code for pausing or stopping the media playback if media playback is still active when the call is answered; computer program code for determining whether the call has ended; and computer program code for resuming or restarting the media playback after the call has ended.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to voice activation for a portable electronic device. The portable electronic device can be a multi-function electronic device. The voice activation can be robust and context sensitive. The voice activation can also be utilized without any preparatory user action with respect to the portable electronic device. The portable electronic device can also interact with a media system.

According to one embodiment, one function that can be supported by the portable electronic device is voice communications. When a voice call is incoming to the portable electronic device, the portable electronic device can automatically control itself or the media system to pause, stop and/or lower its volume so that media playback need not disturb a user while participating in the voice call. After the voice call ends, the portable electronic device can automatically control itself or the media system to resume, start and/or raise its volume so that the user can again participate in media playback.

The invention is well suited for a portable electronic device that can support multiple functions. In one embodiment, the invention is suitable for use with a portable electronic device having at least wireless voice communication capability and media playback capability. The portable electronic device can, for example, be a portable media device (e.g., digital music player or MP3 player) having wireless voice communications. In another embodiment, the portable electronic device can be a wireless communications device (e.g., cellular phone) having media playback and/or media recording capabilities. In still another embodiment, the portable electronic device can be a portable electronic device having media playback or recording capability and workout support via a workout manager. These portable electronic devices can also have other functions (e.g., applications), such as functions supporting electronic calendars, electronic appointments, network browsers, network data transfers, VoIP applications, etc.

Embodiments of the invention are discussed below with reference to FIGS. 1-12. However, those skilled in the art will readily appreciate that the detailed description given herein with respect to these figures is for explanatory purposes as the invention extends beyond these limited embodiments.

Figure 1:
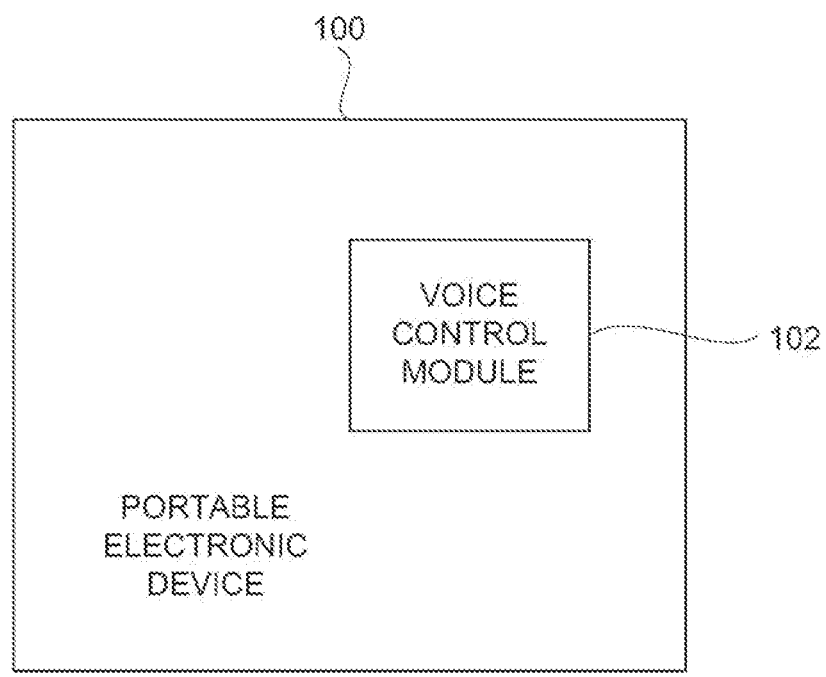
FIG. 1 is a block diagram of a portable electronic device according to one embodiment of the invention.

FIG. 1 is a block diagram of portable electronic device 100 according to one embodiment of the invention. Portable electronic device 100 includes voice control module 102. Voice control module 102 can be used to control portable electronic device 100. More particularly, a user of portable electronic device 100 can issue voice commands to portable electronic device 100. Voice control module 102 analyzes a user's voice input to determine whether it corresponds to a command understood by voice control module 102. If a command is recognized by voice control module 102, portable electronic device 100 can process the command. The command can pertain to any of a number of functions or operations supported by portable electronic device 100. Since portable electronic device 100 is able to operate in a voice-activated manner, portable electronic device 100 needs little or no user input devices, such as buttons, dials, touch pads and the like. Portable electronic device 100, however, can utilize such user input devices to replace or supplement voice commands.

Figure 2:
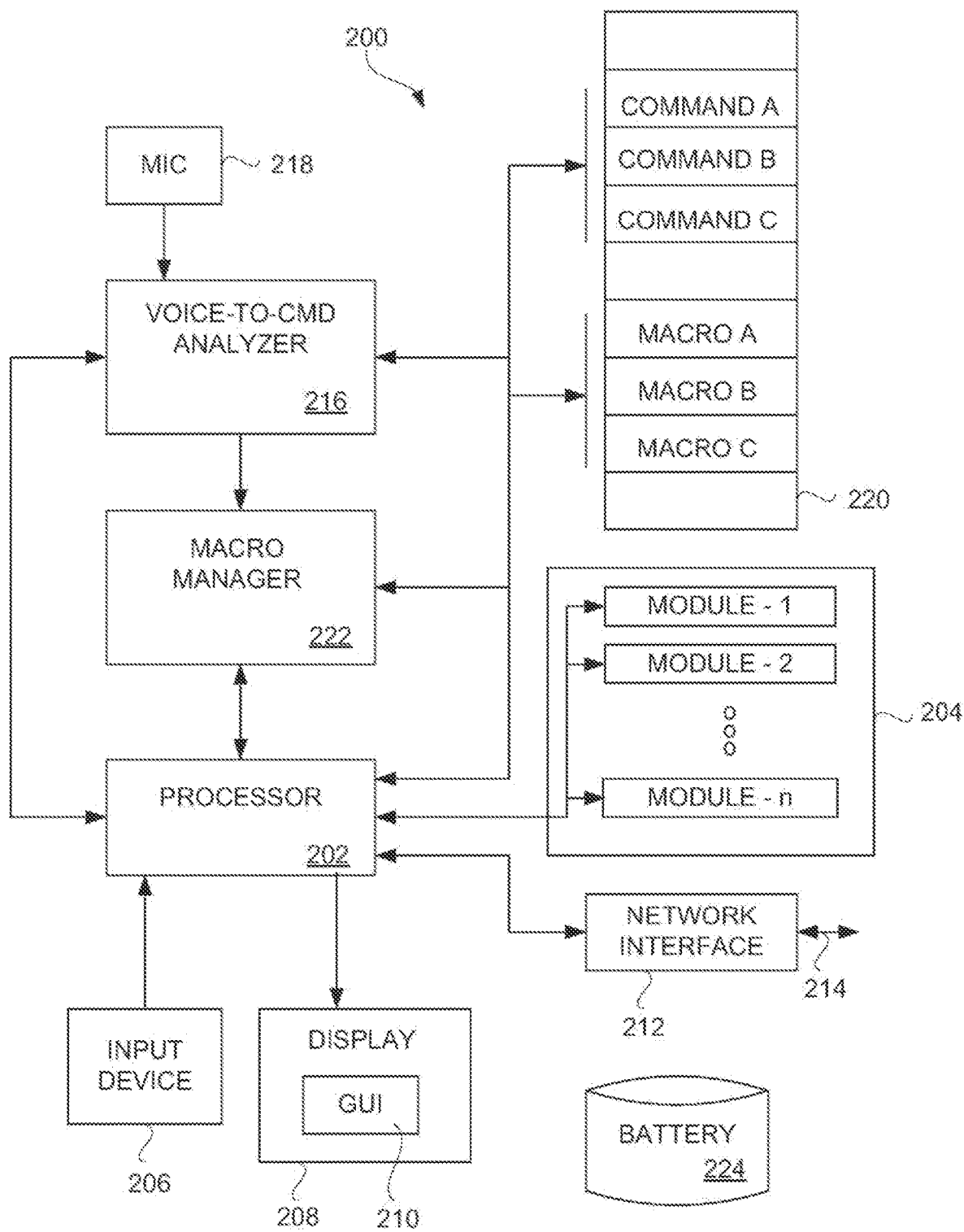
FIG. 2 is a block diagram of an electronic device according to one embodiment of the invention.

FIG. 2 is a block diagram of electronic device 200 according to one embodiment of the invention. Device 200 is typically a portable or mobile electronic device. Device 200 can pertain to a computing device, a media player, a mobile telephone, a portable game player, a portable workout manager, and the like. In one embodiment, device 200 is a multi-function device that supports a plurality of different functions. As one example, device 200 can be portable and operate as a mobile telephone while also operating as a media player. As another example, device 200 can operate as a media player while also operating as a portable workout manager.

Device 200 can include processor 202 that controls the overall operation of device 200. Device 200 can further include a program store 204 that stores a plurality of different software modules. The software modules can provide different functions or operations for the device 200. The software modules can correspond program code for application programs, operating systems, utility programs, and the like.

Device 200 can also include at least one input device 206. Input device 206 can pertain to one or more input buttons, touch-sensitive surfaces, rotary input mechanisms, etc. The input device 206 enables the user to provide user input, such as user selections for usage.

Device 200 can also include a display 208. As appropriate, graphical user interface (GUI) 210 can be presented on display 208. For example, GUI 210 can present a dialog window on display 208 that assists a user in controlling operation of device 200. GUI 210 can also present information to the user of device 200. Input device 206 can assist a user in providing user input to device 200, such as by interacting with GUI 210.

Device 200 also includes a network interface 212. Network interface 212 can establish a link 214 to a network, thereby facilitating wired or wireless network communications. In the case of a wireless network link, network interface 212 can include or pertain to a wireless transceiver.

In addition, device 200 can be controlled by voice control. In this regard, device 200 includes voice-to-command analyzer 216. Voice-to-command analyzer 216 operates to receive an audio input from a user via a microphone 218. Voice-to-command analyzer 216 can then analyze the audio input to determine whether it is requesting execution of a particular one of a set of predetermined commands or a particular one of a set of predetermined macros. As illustrated in FIG. 2, device 200 can include data store 220. Data store 220 can store a plurality of commands or macros as well as other data. These commands or macros are eligible to be executed by device 200 when requested by a voice input. Similarly, voice-to-command analyzer 216 can determine whether the voice input corresponds to a macro from a set of available macros stored in data store 220. The macros can be considered groups or sets of commands which are arranged in a particular sequence. A macro manager 220 can couple to voice-to-command analyzer 216 so that when the voice input corresponds to a macro, the macro manager 222 can manage the performance of the macro, which involves a plurality of commands operated in a particular sequence.

Device 200 can include battery 224 that provides power to device 200. Typically, battery 224 is rechargeable by coupling battery 224 to an AC outlet to allow a charge circuit (not shown) to charge battery 224. Although device 200 is powered by battery 224, in one embodiment, device 200 can also at times utilize power from AC power supplied via power cord coupled to an AC plug. The AC power, when available, is also used to charge battery 224.

Figure 3:
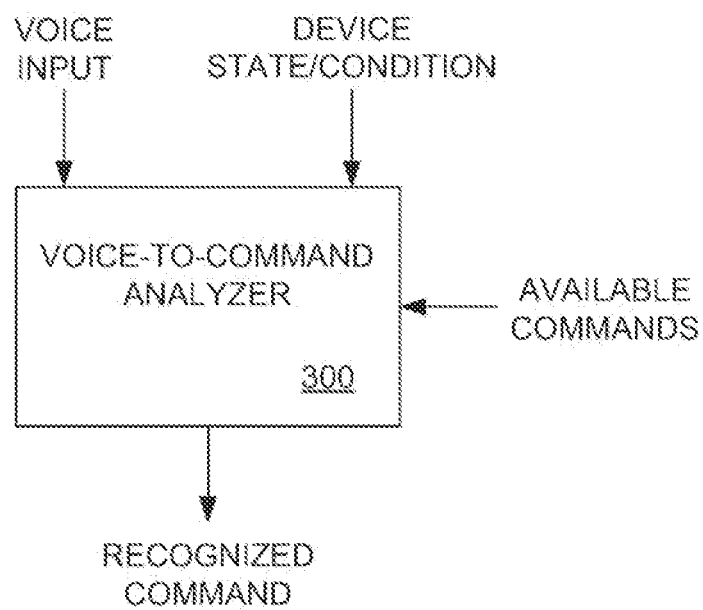
FIG. 3 is a block diagram of voice-to-command analyzer according to one embodiment of the invention.

FIG. 3 is a block diagram of voice-to-command analyzer 300 according to one embodiment of the invention. Voice-to-command analyzer 300 is, for example, one implementation of voice-to-command analyzer 216 illustrated in FIG. 2. Voice-to-command analyzer 300 receives a voice input from a microphone (e.g., microphone 218). Voice-to-command analyzer 300 also receives data pertaining to available commands. For example, the available commands can be stored and accessed in a data store, such as data store 220 illustrated in FIG. 2. In addition, voice-to-command analyzer 300 can receive device state information. The device state information can provide voice-to-command analyzer 300 with information concerning the state of the electronic device (e.g., device 200). The device state information can, for example, pertain to a state, condition, event or the like, which can pertain to hardware or software.

As an example, one state associated with the electronic device having voice-to-command analyzer 300 is a context of a graphical user interface (GUI) utilized by the electronic device. The context of the GUI can then provide state information to the voice-to-command analyzer 300. In one embodiment, depending upon the context of the GUI, different available commands can be utilized and provided to the voice-to-command analyzer 300. In general, as the device state changes, different available commands can be presented to voice-to-command analyzer 300. As a result, the available commands being provided to voice-to-command analyzer 300 can be restricted to those that are appropriate given the current state of the electronic device. Eventually, the voice-to-command analyzer 300 can recognize a command from the voice input. The recognized command is one of the available commands presented to voice-to-command analyzer 300. Of course, the voice input may not correlate to any of the available commands, in which case voice-to-command analyzer 300 would not output a recognized command.

Figure 4:
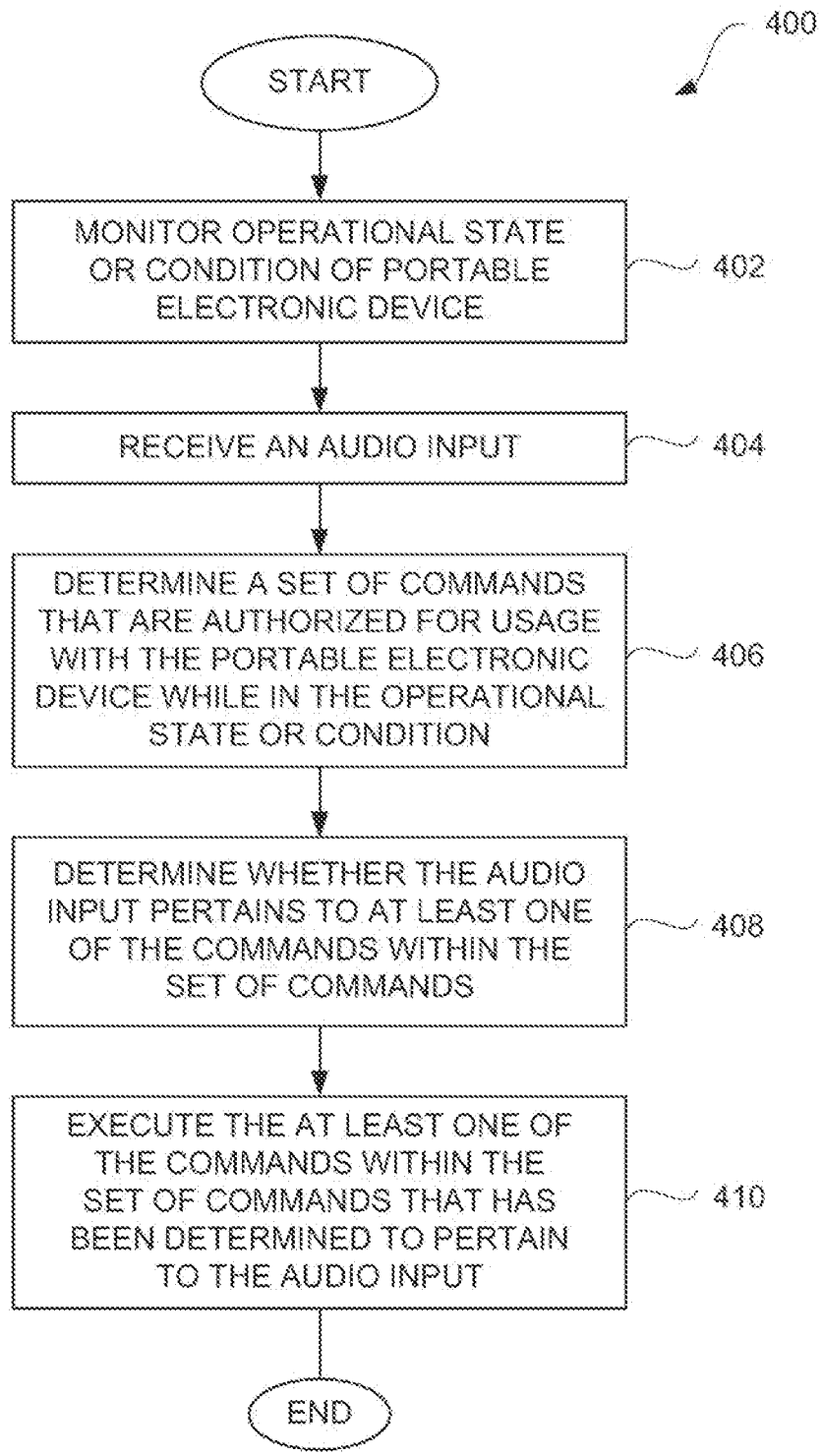
FIG. 4 is a flow diagram of voice command process according to one embodiment of the invention.

FIG. 4 is a flow diagram of voice command process 400 according to one embodiment of the invention. Voice command process 400 is, for example, performed by an electronic device, such as device 100 illustrated in FIG. 1 or device 200 illustrated in FIG. 2.

Voice command process 400 monitors 402 an operational state of a portable electronic device. For example, the operational state may correspond to a functional mode, usage or program being utilized by the portable electronic device. As another example, the operational state can pertain to a state of a graphical user interface being provided on a display associated with the portable electronic device.

The voice command process 400 also receives 404 an audio input. Here, the portable electronic device includes electrical components that enable the portable electronic device to receive 404 an audio input. Typically, the audio input is a voice input provided by a user of the portable electronic device.

Next, a set of commands that are authorized for usage with the portable electronic device while in the operational state can be determined 406. Then, the voice command process 400 can determines 408 whether the audio input pertains to at least one of the commands within the set of commands. Since the determination 408 is limited, in one embodiment, to those commands within the set of commands that are authorized for usage while in the operational state, the determination 408 can be rapidly performed without excessive computational capability and without excessive power consumption. Thereafter, the at least one of the commands within the set of commands that has been determined 408 to pertain to the audio input can be executed 410. Consequently, voice command process 400 receives an audio input from a user, determines which of the limited set of available commands the user is requesting by the audio input, and then executes the appropriate command. Accordingly, an electronic device using voice command process 400 is able to command or control the operation of the electronic device using voice, namely, the electronic device is voice activated.

Figure 5:
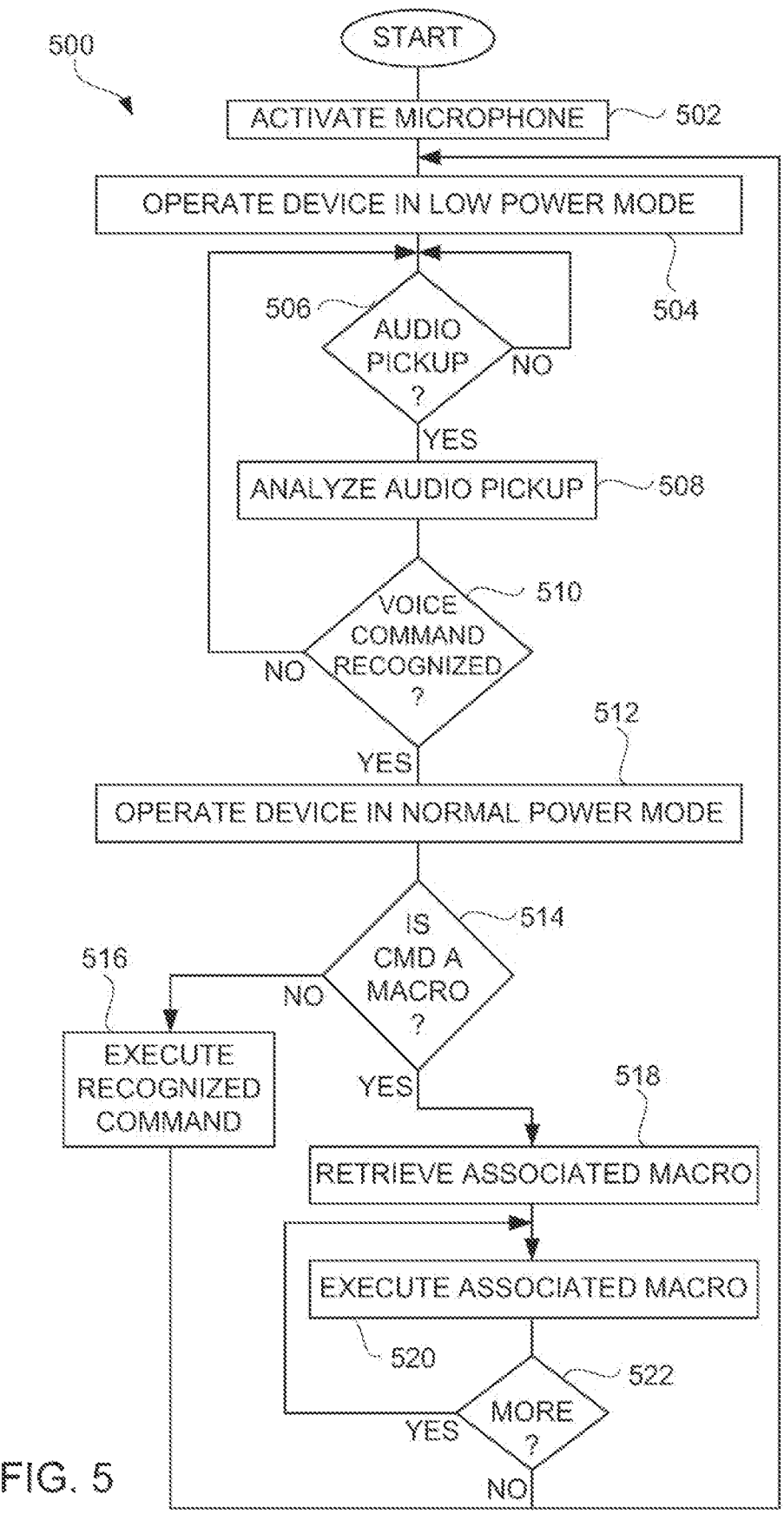
FIG. 5 is a flow diagram of voice command process according to another embodiment of the invention.

FIG. 5 is a flow diagram of voice command process 500 according to another embodiment of the invention. Voice command process 500 is, for example, performed by an electronic device, such as device 100 illustrated in FIG. 1 or device 200 illustrated in FIG. 2.

The voice command process 500 activates 502 a microphone. The device is also operated 504 in a low power mode if appropriate. For example, if the device is substantially idle and no user input is being received, the electronic device can be placed in a low power mode to conserve battery energy. Decision 506 determines whether an audio pickup has been received. The device can receive an audio pickup even while in the low power mode. When decision 506 determines that an audio pickup has not been received, voice command process 500 awaits to receive an audio pickup. Once the decision 506 determines that an audio pickup has been received, the audio pickup is analyzed 508. When analyzing the audio pickup, the processing can be made efficient and more robust by taking into consideration context with which the audio pickup has been received. The context can pertain to the electronic device, such as a state of the electronic device. In other words, the audio pickup can be analyzed 508 in a context-sensitive manner.

Next, decision 510 determines whether a voice command has been recognized. When decision 510 determines that a voice command has not recognized, voice command process 500 returns to repeat decision 506 to subsequently process another audio pickup. On the other hand, when decision 510 determines that a voice command has been recognized, the electronic device is operated 512 in a normal power mode. Here, if the electronic device was in a low power mode, the electronic device is returned to a normal power mode so that the recognized voice command can be quickly and efficiently processed.

In this embodiment, the recognized command can pertain to a macro. Decision 514 determines whether the recognized command is a macro. When the recognized command is not a macro, the recognized command is executed 516. On the other hand, when decision 514 determines that the command is a macro, the associated macro is retrieved 518. The associated macro is then executed 520. Decision 522 then determines whether there is any more operations (e.g., commands) within the associated macro that is to be executed. When decision 522 determines that there are more operations to be executed, voice command process 500 returns to repeat block 520 so that additional operations of the associated macro can be executed. Once decision 522 determines that there are no more operations within the macro to be executed, as well as directly following the block 516, voice command process 500 returns to repeat block 502 and subsequent operations so that a subsequent audio pickup can be processed in a similar manner.

Figure 6:
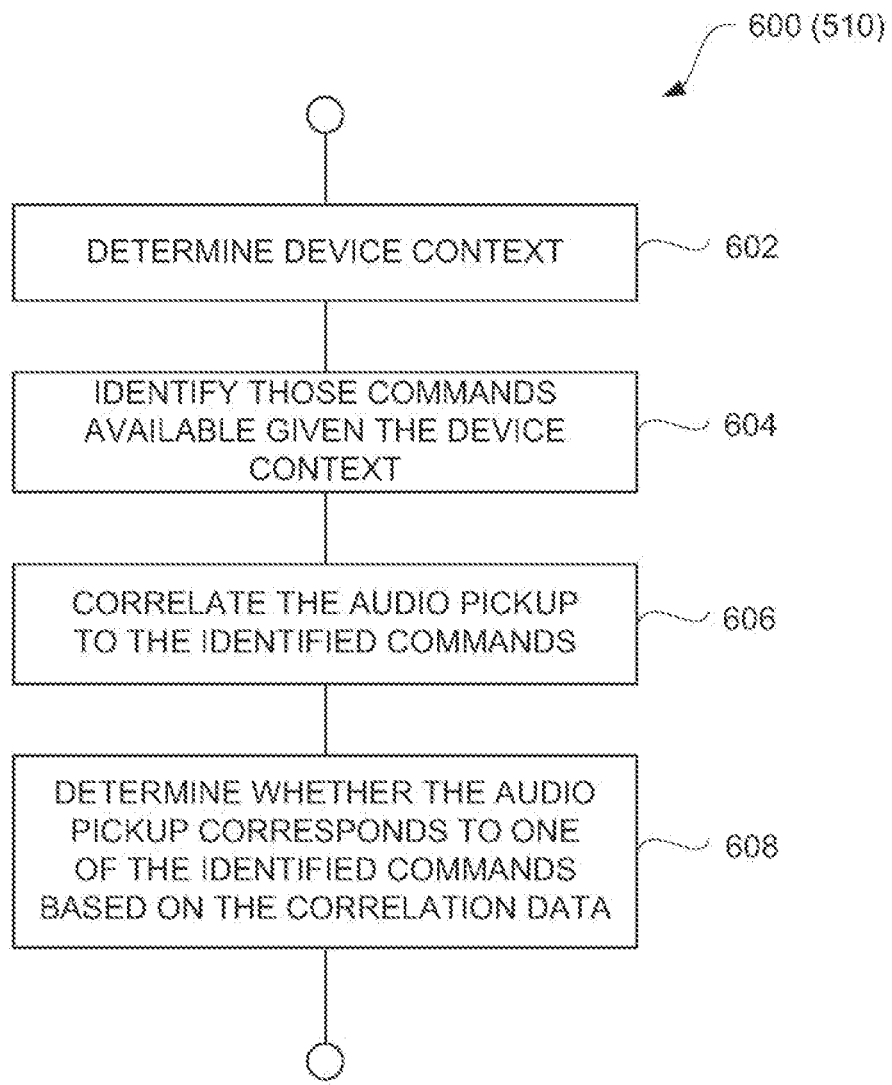
FIG. 6 is a flow diagram of a voice command recognition process according to one embodiment of the invention.

FIG. 6 is a flow diagram of a voice command recognition process 600 according to one embodiment of the invention. The voice command recognition process 600 can, for example, pertain to processing associated with the decision 510 illustrated in FIG. 5. In other words, the voice command recognition process operates to determine whether the audio pickup pertains to one of the available commands supported by an electronic device. In particular, the voice command recognition process 600 can determine 602 a device context. Those commands available given the device context can then be identified 604. The audio pickup can be correlated 606 to the identified commands. Thereafter, the voice command recognition process 600 determines 608 whether the audio pickup corresponds to one of the identified commands based on the correlation data.

Figure 7A:
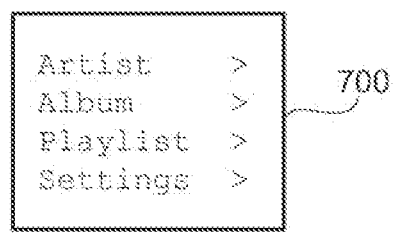
FIGS. 7A-7C illustrate exemplary graphical user interfaces that can be presented on a display device according to certain embodiments of the invention.
Figure 7B:
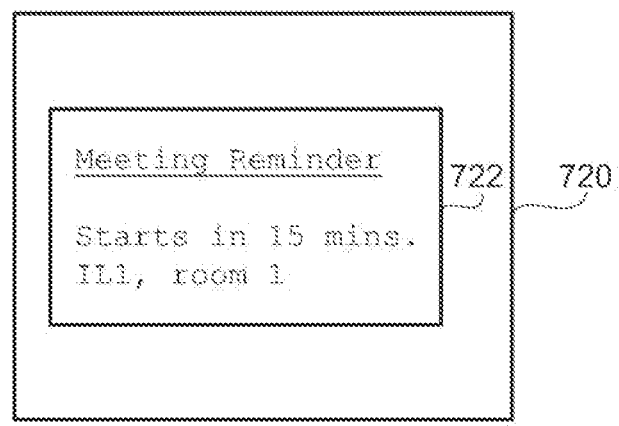
Figure 7C:
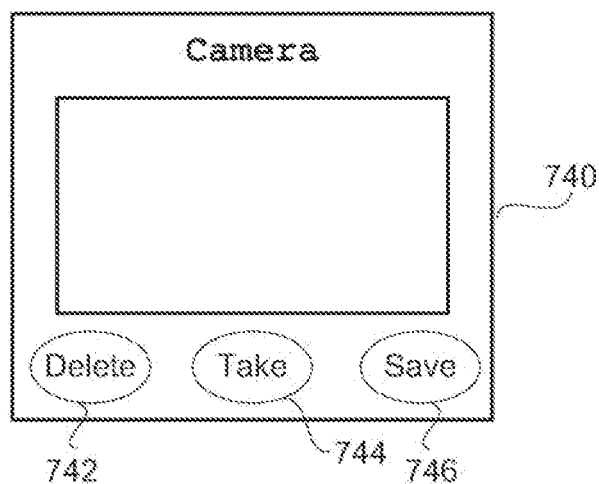

One aspect of the invention pertains restricting available commands based on device context. The device context, in one embodiment, pertains to the state of a graphical user interface (GUI). FIGS. 7A-7C illustrate exemplary graphical user interfaces that can be presented on a display device according to certain embodiment of the invention. These exemplary graphical user interfaces are just a few of the many embodiments that can utilize state of GUI to restrict or limit available voice commands to be recognized.

FIG. 7A illustrates exemplary menu 700 suitable for use on a display device associated with an electronic device according to one embodiment of the invention. While menu 700 is being displayed, a user can provide an audio input that pertains to a voice command. When menu 700 is displayed, the available voice commands that can received can be restricted. The menu 700 can be used to navigate to an appropriate media item or a group of media items to be played by the electronic device. While menu 700 is being displayed, a user can request to play a particular media item. For example, the user might provide an audio input, namely, a voice command, by announcing the phrase "play irreplaceable". Here, the electronic device would recognize that the first portion "play" is a command that is supported and the second term "irreplaceable" is the name of a song available to be played at the electronic device. As another example, the user could provide an audio input, namely, a voice command, by announcing the phrase "play 06", which could be the user requesting to play a playlist denoted as "summer '06" and available at the media device. As still another example, the user could provide an audio input, namely, a voice command, by announcing one of the menu items of the menu 700 (or perhaps even a nested menu) which could effect a selection of such item. For example, the menu items could be categories, classifications, groupings, media items, device settings, device functions, and the like. The menu 700 can represent one menu of a series of nested or hierarchical menus, which can also be navigated or traversed by voice commands.

FIG. 7B illustrates display region 720 of a display device associated with an electronic device according to one embodiment of the invention. Display region 720 includes meeting reminder notification 722. Meeting reminder notification 722 can be displayed on at least a portion of display region 720. In this example, meeting reminder notification 722 informs the user that a meeting to which they are scheduled starts in "15 minutes" at building "IL1, Room 1." In this context, the available commands available to the user can pertain to permitted interaction with the electronic device in response to the meeting reminder. For example, the acceptable commands can be "clear" or "close" which requests that the electronic device close meeting reminder notification 722. Another example is the command "tell" which can respond to the meeting attendees with a message. For example, "tell everyone I will be 10 minutes late" which will be understood by the electronic device as a request to send a text message or email to all attendees of the meeting that the user will be ten (10) minutes late to the meeting.

FIG. 7C is an illustration of exemplary camera window 740 of a display device associated with an electronic device according to one embodiment of the invention. Camera window 740 can be presented on a display device associated with the electronic device. Camera window 740 is displayed on the display device when the electronic device has been placed in a camera mode. While in the camera mode, the available commands can be specific to likely camera operations. For example, in the camera mode, likely camera operations include taking pictures, deleting pictures, saving pictures, etc. Available commands in the camera mode can also include macros. As an example, a macro can be triggered when an audio input is a command requesting that a current picture be taken. As an example, a macro can cause the picture to be taken, cause the picture to be saved in memory, and cause the picture to be uploaded. Although the electronic device is voice-activated, in some embodiments, the electronic device also supports the use of non-voice-activated techniques to provide user input. For example, camera window 740 can include soft buttons 742-746 for which the user can provide user input. Soft buttons 742-746 can be activated using a keypad.

FIGS. 8A-8D illustrate exemplary graphical user interfaces that can be provided on a display device of an electronic device according to certain embodiments of the invention. These graphical user interfaces are associated with an electronic device that supports wireless voice communications. These exemplary graphical user interfaces are just a few of the many embodiments that can be utilized by an electronic device that supports wireless voice communications.

Figure 8A:
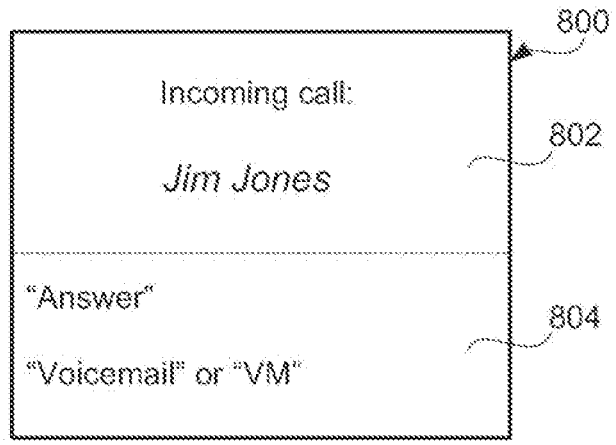
FIGS. 8A-8D illustrate exemplary graphical user interfaces that can be provided on a display device of an electronic device according to certain embodiments of the invention.

FIG. 8A illustrated exemplary graphical user interface (GUI) 800 for an incoming call. GUI 800 is a representative display screen concerning an incoming call from a caller ("Jim Jones") as provided in upper portion 802 of GUI 800. Lower portion 804 of GUI 800 can display some or all of the available commands that can be spoken by a user to initiate the corresponding actions at the electronic device. As shown in FIG. 8A, the exemplary available commands with respect to the particular context of the GUI 800 can include "Answer" or "Voicemail" (or its abbreviated form "VM").

Figure 8B:
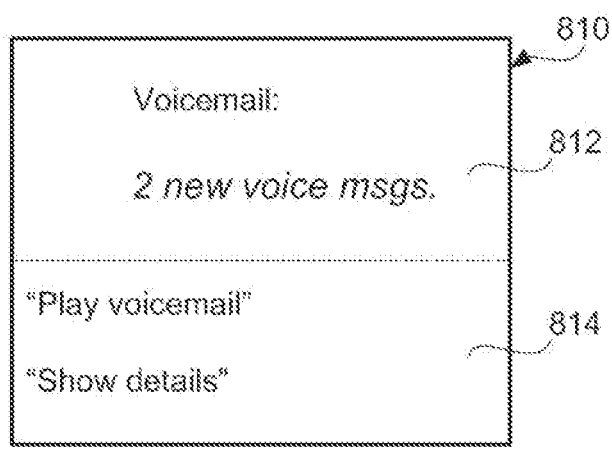

FIG. 8B illustrates exemplary GUI 810 for a voicemail notification. GUI 810 is a representative display screen concerning voicemail available for a user of the electronic device. In upper portion 812 of GUI 810, the user can be informed that there are new voice messages awaiting their review. For example, as shown in FIG. 8B, the user is informed that there are two new voice messages. Lower portion 814 of GUI 810 can display some or all of the available commands that can be spoken by a user to initiate the corresponding actions at the electronic device. In FIG. 8B, the exemplary available commands illustrated in lower portion 814 can include "Play voicemail" and "Show details".

Figure 8C:
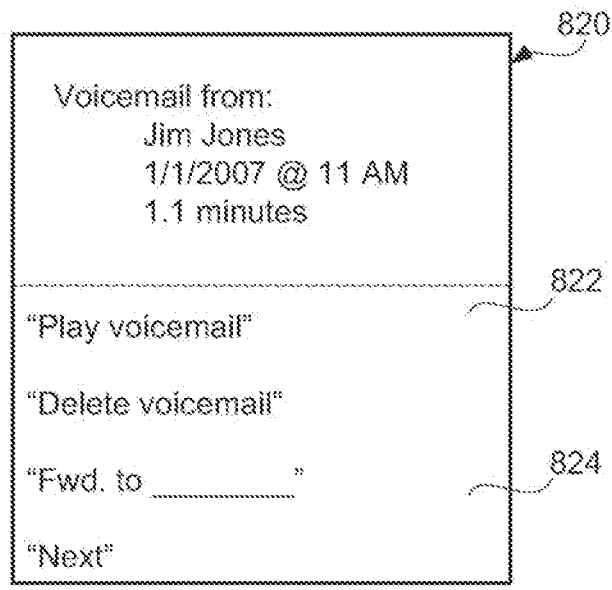

FIG. 8C illustrated exemplary GUI 820 for voicemail review. GUI 820 is a representative display screen for reviewing voicemail at the electronic device. In upper portion 822 of GUI 820, description information pertaining to a voicemail that can be reviewed is provided. In the example illustrated in FIG. 8C, the information concerning the voicemail specifies the caller name, date, time and duration for the voicemail. Lower portion 824 can display some or all exemplary available commands that can be spoken by a user to initiate action at the electronic device. In particular, lower portion 824 indicates that the exemplary available commands can include "Play voicemail", "Delete voicemail", "Forward to [contact]", or "Next". The forward command can specify to forward the voicemail to another person known to the electronic device or another device. For example, the user could provide the command "Forward to Bob" which would be understood by the electronic device to forward the voicemail to Bob, who is a known contact (e.g., address book) of the user. As another example, the user could provide the command "Forward to my computer" which would be understood by the electronic device to forward the voicemail from their portable electronic device (or its associated supporting server) to the user's computer (personal computer).

Figure 8D:
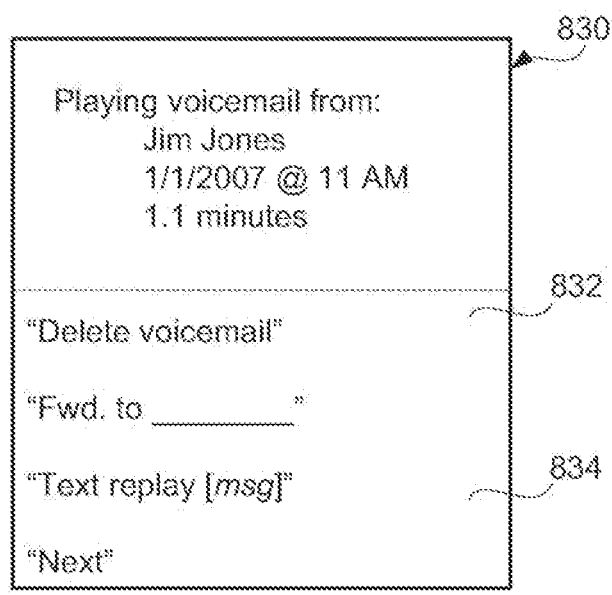

FIG. 8D illustrates exemplary GUI 830 for playing of a voicemail. GUI 830 is a representative display screen for playing voicemail at the electronic device. Upper portion 832 of GUI 830 indicates that descriptive information concerning the voicemail be played. In the example illustrated in FIG. 8D, the information concerning the voicemail specifies the caller name, date, time and duration for the voicemail. Lower portion 834 can display some or all of the available commands while the electronic device is presenting GUI 830. In particular, lower portion 834 indicates that the available commands can include "Delete voicemail", "Forward to [contact]", "Text reply [Msg]". The text reply command can specify to send a reply text message to another person known to the electronic device or another device. For example, the spoken phrase could be "Text reply meet you at noon for lunch," which causes a text message "meet you at noon for lunch" to be sent to Jim, who is the sender of the message being replied to.

According to another embodiment of the invention a portable electronic device can be used in conjunction with a media system. The media system can pertain to a television system, a home stereo, a personal computer, and the like. The media system can also be referred to as a home entertainment system. FIGS. 9A-9E illustrate certain predetermined system configurations for a portable electronic device and a media system.

Figure 9A:
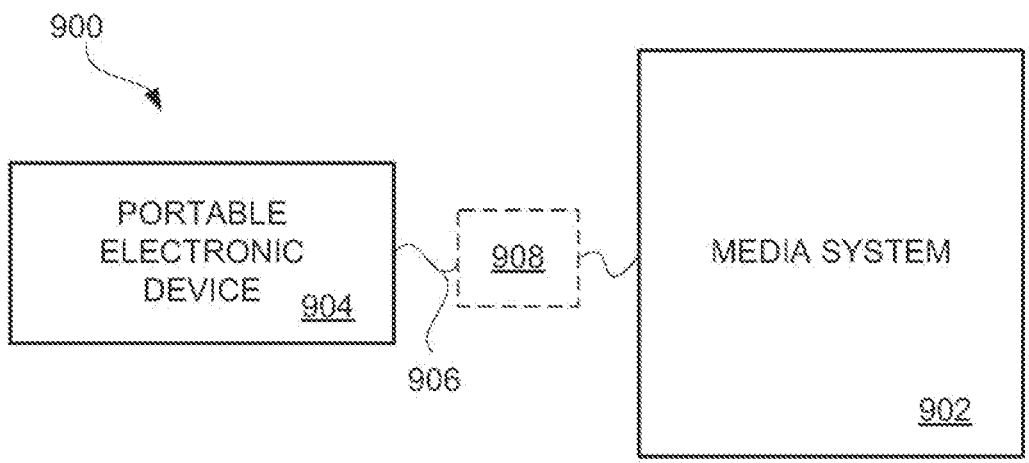
FIGS. 9A-9E illustrate certain predetermined system configurations for a portable electronic device and a media system.

FIG. 9A is a block diagram of system configuration 900 according to one embodiment of the invention. System configuration 900 can include media system 902 and portable media system 904. Portable electronic device 902 is an electronic device, such as a personal computer, mobile communication device, media player (including portable media player), etc. Portable electronic device 902 can couple to media system 902 and thus be used in conjunction with portable electronic device 902. In FIG. 9A, portable electronic device 904 is shown as being apart from media system 902 but connected by way of a wired link 906. The wired link 906 may connect to the media system 902 and the portable electronic device 904 through electronic device, such as a network.

Figure 9B:
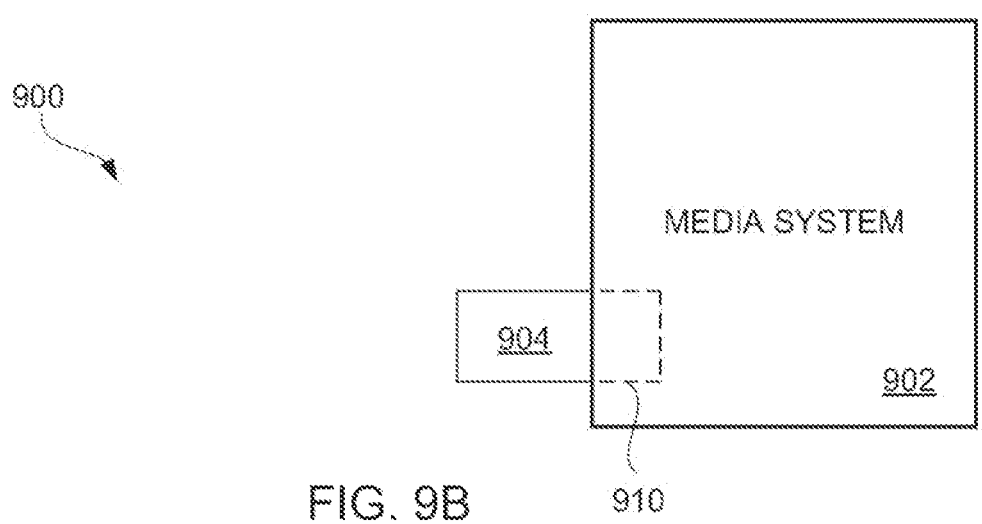

FIG. 9B is a block diagram of system configuration 900' according to another embodiment of the invention. System configuration 900' is generally similar to system configuration 900 illustrated in FIG. 9A. However, in FIG. 9B, portable electronic device 904 has been physically connected to media system 902. In one embodiment, host device 902 can include receptacle 910 that is capable of receiving portable electronic device 904, thereby providing a direct connection between portable electronic device 904 and media system 902.

Figure 9C:
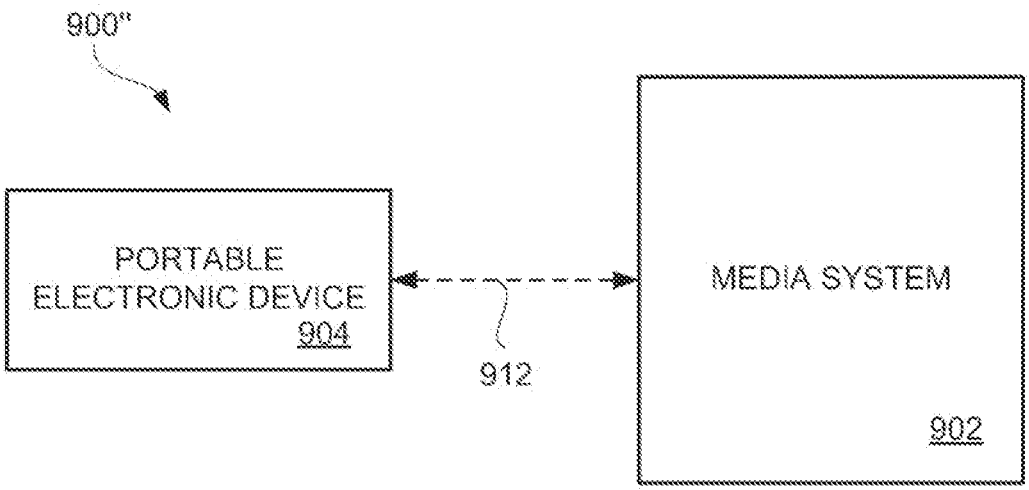

FIG. 9C is a block diagram of system configuration 900" according to another embodiment of the invention. System configuration 900" is generally similar to system configuration 900 as illustrated in FIG. 9A. However, in FIG. 9C, portable electronic device 904 is brought within proximity to media system 902. When portable electronic device 904 is proximate to host device 902, wireless data link 912 can be provided by a short range wireless data link between portable electronic device 904 and media system 902.

Figure 9D:
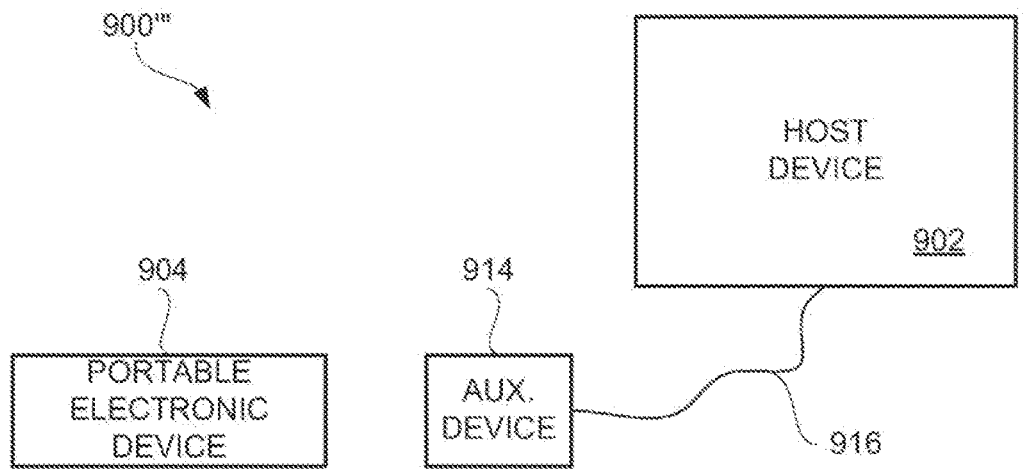

FIG. 9D is a block diagram of system configuration 900''' according to still another embodiment of the invention. System configuration 900''' can include portable electronic device 904 and media system 902 as discussed above in FIG. 9A. However, system configuration 900''' can further include auxiliary device 914 that is electrically connected to host device 902 by way of cable (or wire) 916. In one embodiment, auxiliary device 914 can pertain to a peripheral device for media system 902. One specific example for auxiliary device 914 is a docking station. Auxiliary device 914 can include a receptacle to receive wireless device 904 similar to receptacle 910 illustrated in FIG. 9B. Alternatively, auxiliary device 914 could permit a wireless data link to be established between portable electronic device 904 and auxiliary device 910 so long as such devices are in proximity, which is similar to wireless data link 912 illustrated in FIG. 9C. Auxiliary device 914 can also be referred to an intermediate device. In other words, auxiliary device 914 as shown in FIG. 9D is provided between portable electronic device 904 and media system 902. The intermediate device can pertain to a dock, adapter, media station, media player, personal computer, etc. In one example, an adapter can pertain to a cigarette lighter adapter that can be utilized in a cigarette lighter as typically provided in an automobile.

Figure 9E:
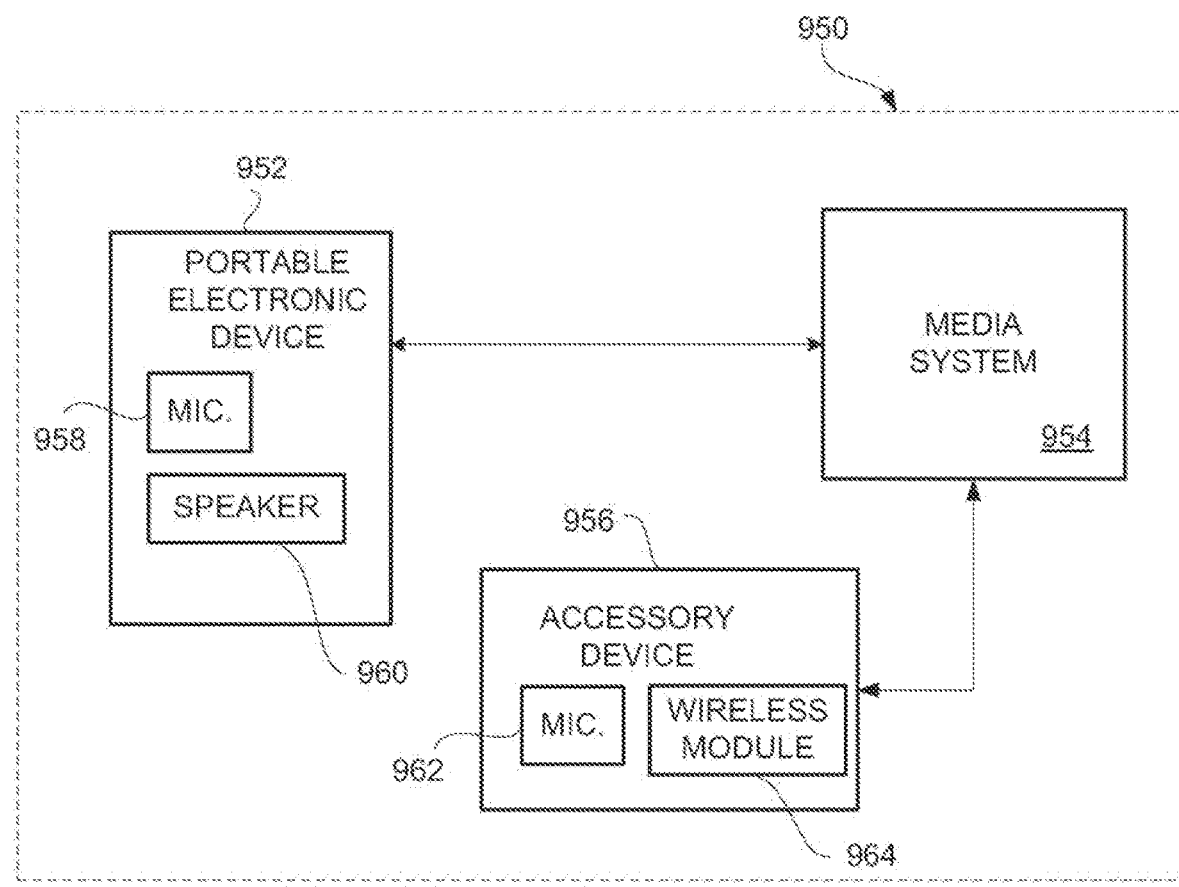

FIG. 9E is a block diagram of local environment 950 according to one embodiment of the invention. Local environment 950 can pertain to an automobile environment, a home environment, an office environment or other relatively constrained local environment. Within local environment 950, portable electronic device 952 can interact with media system 954. Media system 954 can pertain to a television system, a home stereo, a personal computer, and the like. Media system 954 can also be referred to as a home entertainment system. Accessory device 956 can also be provided in local environment 950. Portable electronic device 952 can include microphone 958 and speaker 960. Speaker 960 can be used to output audio sound (audio output) to the user. For example, the audio output can pertain to a voice call or media output. Microphone 958 can be utilized to pick up voice commands that are used by portable electronic device 952 or media system 954. Accessory device 956 can also include microphone 962 to pick up voice commands. Such voice commands can be supplied to media system 954 which, in turn, can supply them to portable electronic device 952, or the voice commands can be directly provided from accessory device 956 to portable electronic device 952. Accessory device 956 can also include wireless module 964. Wireless module 964 can permit accessory device 956 to wirelessly communicate to wireless headset 966. The wireless protocol being utilized between wireless headset 966 and wireless module 964 can pertain to Bluetooth technology or other short range wireless technology. Headset 966 can receive and/or output audio from/to media system 954 or portable electronic device 952. Accessory device 956 could also include a speaker (not shown) to provide audio output.

According to one aspect of the invention, a portable electronic device can interact with a media system. The interaction can be provided via a direct connection, a wired connection to a network, or a wireless connection to a network.

Figure 10:
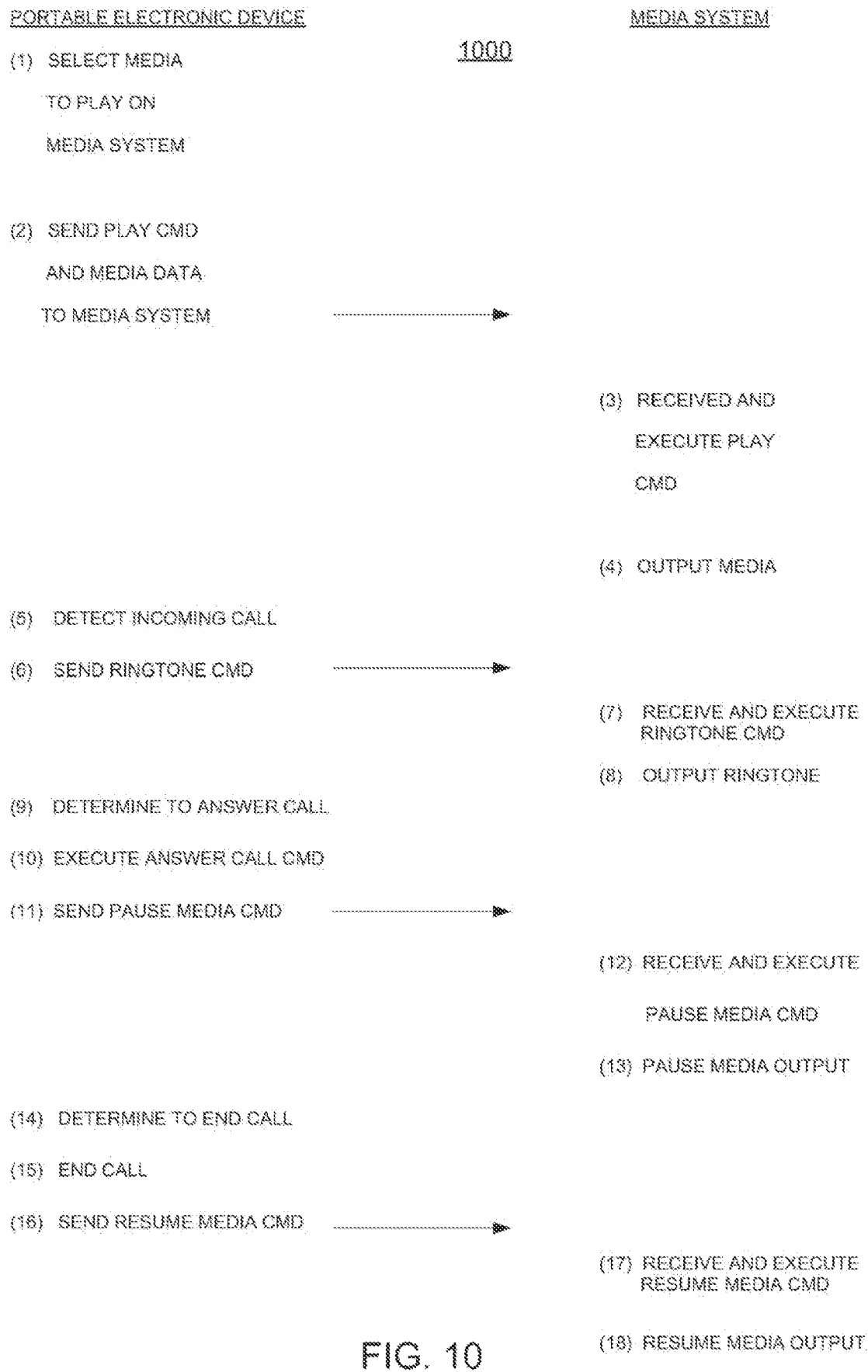
FIG. 10 illustrates process involving interaction between a portable electronic device and a media system according to one embodiment of the invention.

FIG. 10 illustrates process 1000 involving interaction between a portable electronic device and a media system according to one embodiment of the invention. In this embodiment, the context of the interaction is such that the media system is playing media using media data provided by the portable electronic device, while also answering a telephone call at the portable electronic device.

Process 1000 is a representative process that can be utilized between a portable electronic device and a media system according to one embodiment of the invention. At step 1, media to be played on the media system can be selected. A play command and the media data can then be sent to the media system (step 2). At the media system, the play command and the media data can be received and then the play command executed (step 3). Hence, media corresponding to the media data is output (step 4). Here, in this embodiment, the media data for the media to be played is provided by the portable electronic device to the media system. In another embodiment, the media data could be resident on the media system and when the play command is executed, the media could be output from the media data resident on a media system.

At some time later, assuming that the media is still being output, an incoming call can be detected (step 5). When an incoming call is detected (step 5), a ringtone command can be sent to the media system (step 6). The media system can subsequently receive and execute the ringtone command (step 7) when the ringtone command is executed, a ringtone is output (step 8). At the portable electronic device, when the ringtone is output (step 8), the user of the portable electronic device understands that there is an incoming call that can be answered. It should be understood that the ringtone could also be output directly at the portable electronic device. However, one advantage of outputting the ringtone by the media system is that the media being output by the media system can also continue to be output in a manner such that the ringtone can still be heard. For example, when outputting the ringtone, the output of the media (step 4) could have its volume lowered. In any case, at step 9, it is determined whether the user desires to answer the call. In this embodiment, it is assumed that the user will signal the portable electronic device using a voice command. Alternatively, the user can signal the portable electronic device to answer the call through a physical selection (e.g., button press). Hence, when the user has signaled to answer the call by a voice command, an answer call command will be executed (step 10). Since the call is being answered, a pause media command can be sent to the media system (step 11). The media system then receives and executes the pause media command (step 12). In doing so, media output is paused (step 13). Then, the user participates in the call and at some time later determines to end the call (step 14). Again, the determination to end the call can be done in a voice-activated manner. Alternatively, the end of the call can be initiated through a physical selection (e.g., button press). In any case, when the determination is made to end the call (step 14), the call is ended (step 15). A resume media command can then be sent to the media system (step 16). At the media system, the resume media command can be received and executed (step 17). The media output is then resumed (step 18).

Figure 11A:
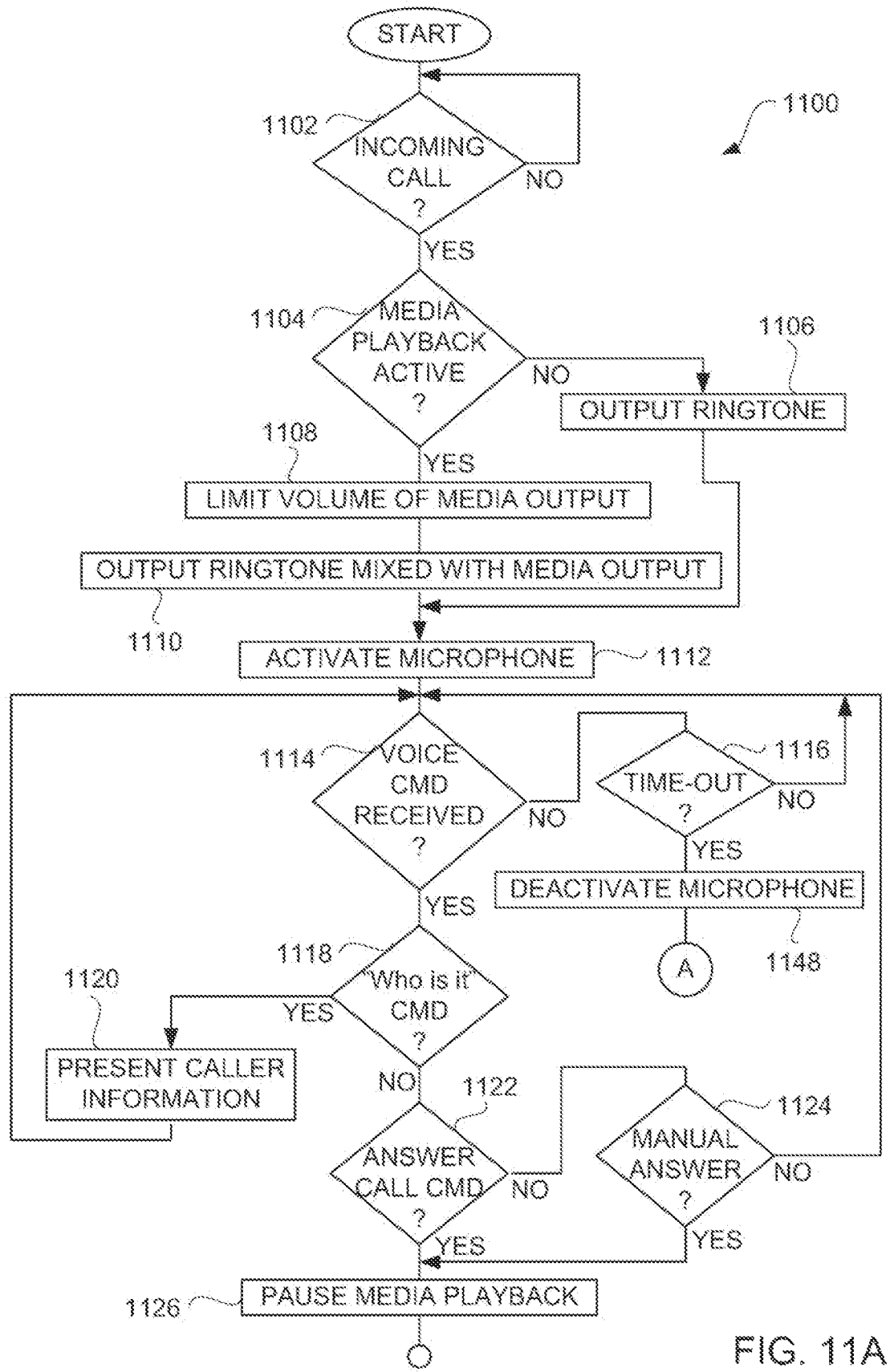
FIGS. 11A and 11B are flow diagrams of process concerning media playback and voice call handling according to one embodiment of the invention.
Figure 11B:
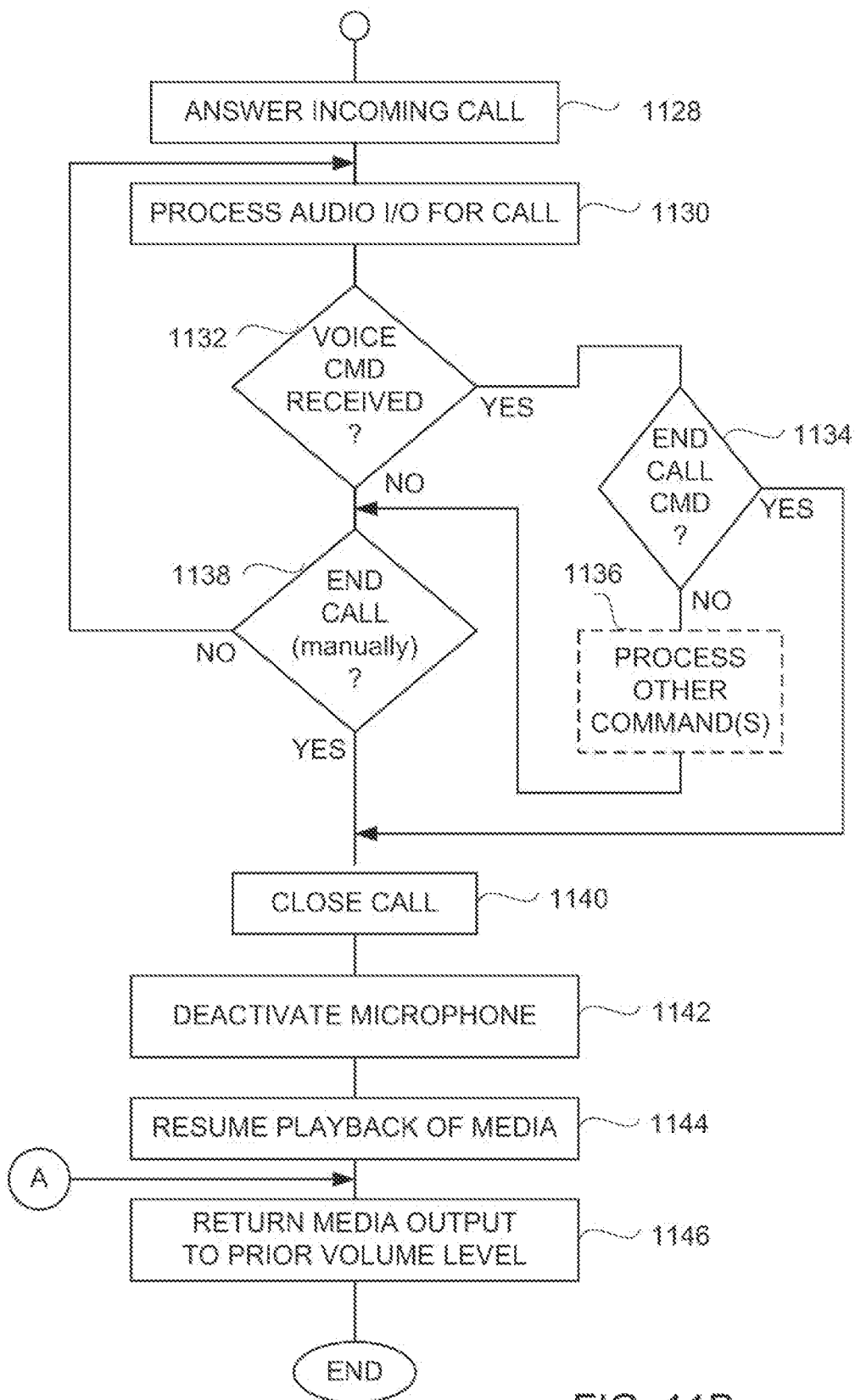

FIGS. 11A and 11B are flow diagrams of process 1100 according to one embodiment of the invention. Process 1100 concerns media playback and voice call handling. In one example, process 1100 can be performed by a portable electronic device supporting wireless voice communications and media playback. In another example, process 1100 can be performed by a portable electronic device supporting wireless voice communications and a media system providing media playback.

Process 1100 can begin with decision 1102 that determines whether a call is incoming. When decision 1102 determines that a call is not incoming, process 1100 waits for an incoming call. On the other hand, when decision 1102 determines that a call is incoming, decision 1104 determines whether media playback is active. When decision 1104 determines that media playback is not active a ringtone can be output 1106. Alternatively, when decision 1104 determines that media playback is active, the volume of the media output can be limited 1108. Also, a ringtone mixed with the media output can be output 1110. Following block 1106 or block 1110, a microphone can be activated 1112.

Next, decision 1114 determines whether a voice command has been received. When decision 1114 determines that a voice command has not been received, decision 1116 determines whether a time-out has occurred. The time-out refers to a predetermined period of time during which the user of the electronic device can answer the incoming call. During this period of time, the microphone is activated so that a voice command can be received. When decision 1116 determines that a time-out has not yet occurred, process 1100 returns to repeat decision 1114 to continue to determine whether a voice command has been received. When decision 1114 determines that a voice command has been received, decision 1118 can determine whether a "who is it" command has been received. The "who is it" command is one type of voice command that can be received. When decision 1118 determines that a "who is it" command has been received, then caller information can be presented 1120. Presentation 1120 of caller information can be performed using a display device and/or by audio output. Following block 1120, process 1100 returns to repeat decision 1114 and subsequent blocks.

On the other hand, when decision 1118 determines that the voice command received is not a "who is it" command, decision 1122 determines whether the voice command is an answer call command. When decision 1122 determines that the voice command is not an answer call command, decision 1124 determines whether a call is to be manually answered. When decision 1124 determines that the call is not to be manually answered, then process 1100 returns to repeat decision 1114. Alternatively, when decision 1122 determines that the voice command received is an answer call command, as well as following decision 1124 when the call is to be manually answered, the media playback is paused 1126. By pausing the media playback, the user of the electronic device is able to participate in the call without being disturbed by the media playback. In another embodiment, the media playback can continue with its volume substantially limited such that it is does not materially interfere with the ability of the user to participate in the call. The incoming call is also answered 1128. Audio input/output for the call can then be processed 1130.

As the call continues, audio pertaining to the call will be incoming and outgoing so as to carry out the conversation or communications associated with the call. Decision 1132 can determine during the call whether a voice command has been received. Here, during the call, the electronic device can render certain commands as being available to be voice-activated by a user. When decision 1132 determines that a voice command has been received, decision 1134 determines whether the voice command is an end call command. The end call command is one type of voice command that can be received. When decision 1134 determines that the voice command that has been received is not an end call command, then optionally other commands can be processed 1136. Alternatively, when decision 1132 determines that a voice command has not been received, as well as following block 1136, decision 1138 determines whether a call is to end. Here, the call can be ended by a manual operation with respect to the electronic device. In other words, decision 1138 is a manual operation that is distinct from a voice command. When decision 1138 determines that the call is not to end, process 1100 returns to repeat block 1130 and subsequent blocks. Alternatively, when decision 1138 determines that the call is to end manually, or when decision 1134 determines that the received voice command is an end call command, then the call is closed 1140. Further, the microphone is deactivated 1142. In addition, playback of the media can be resumed 1144. Also, when decision 1116 determines that a time-out has occurred, the microphone can also be deactivated 1148. Following block 1148 or block 1144, the media output can be returned 1146 to its prior volume level. Following block 1146, process 1100 can end.

The media playback and voice call handling discussed above in FIGS. 10, 11A and 11B are examples of control of a media system by way of voice commands provided at a portable electronic device (or an associated accessory device). More generally, according to one embodiment of the invention, a media system can be controlled in any of a number of ways by voice commands provided at a portable electronic device (or an associated accessory device). For example, a user of the portable electronic device can provide voice comments that cause the media system to perform a channel change, a mute operation, media source change, track change, playback operation, stop playback, volume adjustment, etc.

The electronic device as described herein can be a wireless communication device (e.g., portable telephone) capable of communication over a network. The wireless communication device can also include other applications such as a media playback application or a media recording application.

The electronic device as described herein can be a media device (e.g., media player) capable of playing (including displaying) media items. The media items can pertain to audio items (e.g., audio files or songs), videos (e.g., movies) or images (e.g., photos). The media device can also include other applications such as a wireless communication application.

In one embodiment, the electronic device is a portable electronic device. In one implementation, the portable electronic device is a handheld electronic device. Often, portable electronic devices are handheld electronic devices that can be easily held by and within a single hand of a user. The portable electronic device can also pertain to a wearable electronic device or a miniature electronic device. However, the invention can apply to electronic devices whether portable or not.

Figure 12:
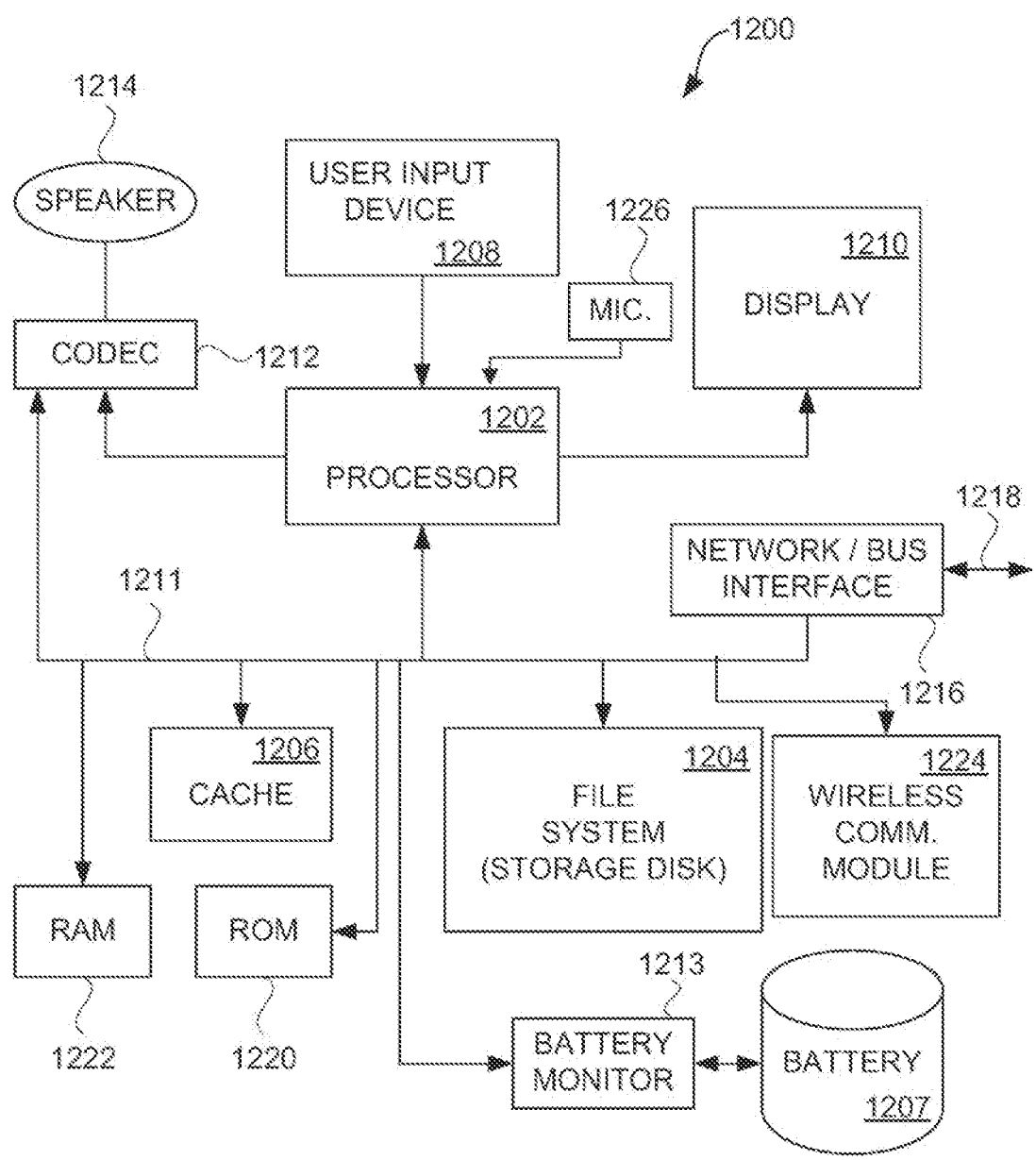
FIG. 12 is a block diagram of media player according to one embodiment of the invention.

FIG. 12 is a block diagram of media player 1200 according to one embodiment of the invention. Media player 1200 can include the circuitry of device 100 in FIG. 1, device 200 in FIG. 2, device 900 in FIGS. 9A-9C, device 952 in FIG. 9D, or can perform the operations described with reference to FIGS. 4-6, 10 or 11A and 11B, and/or can present a display screen as in FIGS. 7A-7C or FIGS. 8A-8D.

Media player 1200 can include processor 1202 that pertains to a microprocessor or controller for controlling the overall operation of media player 1200. Media player 1200 can store media data pertaining to media items in file system 1204 and cache 1206. File system 1204 is, typically, a storage disk or a plurality of disks. File system 1204 typically provides high capacity storage capability for media player 1200. File system 1204 can store not only media data but also non-media data. However, since the access time to file system 1204 is relatively slow, media player 1200 can also include cache 1206. Cache 1206 is, for example, Random-Access Memory (RAM) provided by semiconductor memory. The relative access time to cache 1206 can be substantially shorter than for file system 1204. However, cache 1206 does not have the large storage capacity of file system 1204. Further, file system 1204, when active, consumes more power than does cache 1206. The power consumption is often a concern when media player 1200 is a portable media player that is powered by battery 1207. Media player 1200 can also include RAM 1220 and Read-Only Memory (ROM) 1222. ROM 1222 can store programs, utilities or processes to be executed in a non-volatile manner. RAM 1220 provides volatile data storage, such as for cache 1206.

Media player 1200 can also include user input device 1208 that allows a user of media player 1200 to interact with media player 1200. For example, user input device 1208 can take a variety of forms, such as a button, keypad, dial, etc. (physical or soft implementations) each of which can be programmed to individually or in combination perform any of a suite of functions. In one implementation, user input device 1208 can be provided by a dial that physically rotates. In another implementation, user input device 1208 can be implemented as a touchpad (i.e., a touch-sensitive surface). In still another implementation, user input device 1208 can be implemented as a combination of one or more physical buttons as well as a touchpad. Still further, media player 1200 can include display 1210 (screen display) that can be controlled by processor 1202 to display information to the user. Data bus 1211 can facilitate data transfer between at least file system 1204, cache 1206, processor 1202, and CODEC 1212.

Media player 1200 can also provide status monitoring of battery 1207. In this regard, media player 1200 can include battery monitor 1213. Battery monitor 1213 can be operatively coupled to battery 1207 to monitor conditions. Battery monitor 1213 can, for example, communicate battery status (or conditions) with processor 1202.

In one embodiment, media player 1200 can serve to store a plurality of media items (e.g., songs, videos, TV shows, podcasts, etc.) in file system 1204. When a user desires to have media player 1200 play a particular media item, a list of available media items can be displayed on display 1210. Then, using user input device 1208 (or voice commands), a user can select one of the available media items. Processor 1202, upon receiving a selection of a particular media item, can supply the media data (e.g., audio file) for the particular media item to coder/decoder (CODEC) 1212. CODEC 1212 can then produce analog output signals for speaker 1214. Speaker 1214 can be a speaker internal to media player 1200 or external to media player 1200. For example, headphones or earphones that connect to media player 1200 could be considered an external speaker. Speaker 1214 can not only be used to output audio sounds pertaining to the media item being played, but also to output audio notifications pertaining to battery status. Notifications of battery status can also be output to display 1210.

In one embodiment, media player 1200 is a portable computing device that can support processing media, such as audio and/or video. For example, media player 1200 can be a music player (e.g., MP3 player), a video player, a game player, and the like. These devices are generally battery operated and highly portable so as to allow a user to listen to music, play games or video, record video or take pictures wherever the user travels.

In one implementation, media player 1200 is a handheld device sized for placement into a pocket or hand of the user. By being handheld, media player 1200 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, in one implementation, the device may be operated by the user's hands; no reference surface such as a desktop is needed.

Media player 1200 can also include network/bus interface 1216 that couples to data link 1218. Data link 1218 can allow media player 1200 to couple to a host computer. Data link 1218 can be provided over a wired connection or a wireless connection. In the case of a wireless connection, network/bus interface 1216 can include a wireless transceiver.

To support wireless communications, media player 1200 can also include wireless communications module 1224. Wireless communication module 1224 can be considered to provide voice communications (e.g., calls via a cellular network), whereas network/bus interface 1216 can be considered to provide data communications. A user of media player 1200 can thus make and receive voice calls using the wireless communications module in media player 1200. Wireless communications module 1224 can also couple to data bus 1211 to couple to processor 1202 and other resources. Media player 1200 can also include microphone 1226 for pick up of the user's voice.

The invention is suitable for use with battery-powered electronic devices. However, the invention is particularly well suited for handheld electronic devices, such as a handheld media device. One example of a handheld media device is a portable media player (e.g., music player or MP3 player). Another example of a handheld media device is a mobile telephone (e.g., cell phone) or Personal Digital Assistant (PDA).

Portable media devices can store and play audio sounds pertaining to media assets (media items), such as music, audiobooks, meeting recordings, and other speech or voice recordings. Portable media devices, such as media players, are small and highly portable and have limited processing resources. Often, portable media devices are handheld media devices which can be easily held by and within a single hand of a user.

One example of a media player is the iPod® media player, which is available from Apple Inc. of Cupertino, Calif. Often, a media player acquires its media assets from a host computer that serves to enable a user to manage media assets. As an example, the host computer can execute a media management application to utilize and manage media assets. One example of a media management application is iTunes®, produced by Apple Inc.

"Media items," as used herein, is digital data that pertains to at least one of audio, video, or images. Media items are also referred to as digital media assets. The digital data for media items can be referred to as media data or media content. Some examples of specific forms of media items include, but are not limited to, songs, albums, audiobooks, playlists, movies, music videos, photos, computer games, podcasts, audio and/or video presentations, news reports, and sports updates. Video media items include movies, music videos, video presentations, and any other media items having a video characteristic.

U.S. patent application Ser. No. 11/209,367, filed Aug. 22, 2005, and entitled "AUDIO STATUS INFORMATION FOR A PORTABLE ELECTRONIC DEVICE," is hereby incorporated herein by reference.

U.S. patent application Ser. No. 11/565,890, filed Dec. 1, 2006, and entitled "POWER CONSUMPTION MANAGEMENT FOR FUNCTIONAL PRESERVATION IN A BATTERY-POWERED ELECTRONIC DEVICE," is hereby incorporated herein by reference.

U.S. patent application Ser. No. 10/981,993, filed Nov. 4, 2004, and entitled "AUDIO USER INTERFACE FOR COMPUTING DEVICE." is hereby incorporated herein by reference.

The various aspects, embodiments, implementations or features of the invention can be used separately or in any combination.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that an electronic device can be user controlled through voice commands. Another advantage of the invention is that available voice commands can be context sensitive for robust and power efficient operation. Yet another advantage of the invention is that an electronic device can intelligently interact with a nearby media system to provide multiple functions (e.g., media playback and wireless voice communications).

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An electronic device operable in a plurality of operational states, the portable electronic device comprising a processor and memory storing one or more programs for execution by the processor, the one or more programs comprising instructions for:
   detecting, via a microphone of the electronic device, a voice input from a user;
   determining that at least a portion of the voice input matches characteristics of one or more predetermined commands, wherein the one or more predetermined commands include commands that are authorized for usage while the electronic device is in an operational state;
   determining that the electronic device is in the operational state; and
   in accordance with a determination that the at least a portion of the voice input matches characteristics of the or more predetermined commands and a determination that the electronic device is in the operational state, executing the one or more predetermined commands.

2. The electronic device of claim 1, wherein the one or more predetermined commands correspond to a macro including at least a series of commands to be performed.

3. The electronic device of claim 1, wherein the operational state of the electronic device is one of:
   a state of graphical user interface being displayed on the electronic device;
   a functional mode of the electronic device; and
   a low power mode.

4. The electronic device of claim 3, wherein the operational state of the electronic device is a low power mode and, wherein detecting the voice input from the user includes monitoring for the voice input while in the low power mode.

5. The electronic device of claim 4, wherein the operational state is dependent on a state of an application program being executed by the processor.

6. The electronic device of claim 1, wherein the electronic device is a multi-function device supporting a plurality of functions, one of the functions being wireless voice communications and another of the functions being media playback or media recording.

7. The electronic device of claim 1, wherein the electronic device is a handheld electronic device.

8. The electronic device of claim 1, wherein executing the one or more predetermined commands includes changing the operational mode of the electronic device to another operational mode.

9. The electronic device of claim 8, wherein the operational state of the electronic device is a low power mode, and wherein the another operational mode of the electronic device is a normal power mode.

10. A non-transitory computer-readable storage medium storing one or more programs configured to be executed by one or more processors of an electronic device operable in a plurality of operational states, the one or more programs including instructions for:
   detecting, via a microphone of the electronic device, a voice input from a user;
   determining that at least a portion of the voice input matches characteristics of one or more predetermined commands, wherein the one or more predetermined commands include commands that are authorized for usage while the electronic device is in an operational state;
   determining that the electronic device is in the operational state; and
   in accordance with a determination that the at least a portion of the voice input matches characteristics of the or more predetermined commands and a determination that the electronic device is in the operational state, executing the one or more predetermined commands.

11. The non-transitory computer-readable storage medium of claim 10, wherein the one or more predetermined commands correspond to a macro including at least a series of commands to be performed.

12. The non-transitory computer-readable storage medium of claim 10, wherein the operational state of the electronic device is one of:
   a state of graphical user interface being displayed on the electronic device;
   a functional mode of the electronic device; and
   a low power mode.

13. The non-transitory computer-readable storage medium of claim 12, wherein the operational state of the electronic device is a low power mode and, wherein detecting the voice input from the user includes monitoring for the voice input while in the low power mode.

14. The non-transitory computer-readable storage medium of claim 13, wherein the operational state is dependent on a state of an application program being executed by the processor.

15. The non-transitory computer-readable storage medium of claim 10, wherein the electronic device is a multi-function device supporting a plurality of functions, one of the functions being wireless voice communications and another of the functions being media playback or media recording.

16. The non-transitory computer-readable storage medium of claim 10, wherein the electronic device is a handheld electronic device.

17. The non-transitory computer-readable storage medium of claim 10, wherein executing the one or more predetermined commands includes changing the operational mode of the electronic device to another operational mode.

18. The non-transitory computer-readable storage medium of claim 17, wherein the operational state of the electronic device is a low power mode, and wherein the another operational mode of the electronic device is a normal power mode.

19. A method comprising:
  detecting, via a microphone of an electronic device operable in a plurality of operational states, a voice input from a user;
  determining that at least a portion of the voice input matches characteristics of one or more predetermined commands, wherein the one or more predetermined commands include commands that are authorized for usage while the electronic device is in an operational state;
  determining that the electronic device is in the operational state; and
  in accordance with a determination that the at least a portion of the voice input matches characteristics of the or more predetermined commands and a determination that the electronic device is in the operational state, executing the one or more predetermined commands.

20. The method of claim 19, wherein the one or more predetermined commands correspond to a macro including at least a series of commands to be performed.

21. The method of claim 19, wherein the operational state of the electronic device is one of:
  a state of graphical user interface being displayed on the electronic device;
  a functional mode of the electronic device; and
  a low power mode.

22. The method of claim 21, wherein the operational state of the electronic device is a low power mode and, wherein detecting the voice input from the user includes monitoring for the voice input while in the low power mode.

23. The method of claim 22, wherein the operational state is dependent on a state of an application program being executed by the processor.

24. The method of claim 19, wherein the electronic device is a multi-function device supporting a plurality of functions, one of the functions being wireless voice communications and another of the functions being media playback or media recording.

25. The method of claim 19, wherein the electronic device is a handheld electronic device.

26. The method of claim 19, wherein executing the one or more predetermined commands includes changing the operational mode of the electronic device to another operational mode.

27. The method of claim 26, wherein the operational state of the electronic device is a low power mode, and wherein the another operational mode of the electronic device is a normal power mode.

* * * * *

UNITED STATES PATENT AND TRADEMARK OFFICE
CERTIFICATE OF CORRECTION

PATENT NO. : 11,012,942 B2
APPLICATION NO. : 16/778826
DATED : May 18, 2021
INVENTOR(S) : Daniel Freeman et al.

It is certified that error appears in the above-identified patent and that said Letters Patent is hereby corrected as shown below:

On the Title Page

Column 2, item (57), In the Abstract, Line 2, before "activated" delete "to".

In the Claims

In Column 17, Line 67, Claim 1, before "or" insert -- one --.

In Column 18, Line 51, Claim 10, before "or" insert -- one --.

In Column 20, Line 3, Claim 19, before "or" insert -- one --.

Signed and Sealed this
Second Day of August, 2022

Katherine Kelly Vidal
*Director of the United States Patent and Trademark Office*